United States Patent
Feltham et al.

(10) Patent No.: US 12,304,274 B2
(45) Date of Patent: May 20, 2025

(54) VEHICLE SEAT FOR STORING THERMAL ENERGY FOR OCCUPANT COMFORT

(71) Applicant: Rivian IP Holdings, LLC, Plymouth, MI (US)

(72) Inventors: Graham Lloyd Feltham, Irvine, CA (US); Jake DeBoer, Mission Viejo, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 127 days.

(21) Appl. No.: 17/959,669

(22) Filed: Oct. 4, 2022

(65) Prior Publication Data

US 2023/0191871 A1  Jun. 22, 2023

Related U.S. Application Data

(60) Provisional application No. 63/291,202, filed on Dec. 17, 2021.

(51) Int. Cl.
  *B60H 1/00* (2006.01)
  *B60N 2/00* (2006.01)
  *B60N 2/56* (2006.01)

(52) U.S. Cl.
  CPC ..... *B60H 1/00499* (2019.05); *B60H 1/00285* (2013.01); *B60H 1/00742* (2013.01); *B60N 2/003* (2023.08); *B60N 2/56* (2013.01); *B60N 2210/24* (2023.08); *B60N 2210/30* (2023.08); *B60N 2210/40* (2023.08); *B60N 2230/20* (2023.08); *B60N 2230/30* (2023.08)

(58) Field of Classification Search
  CPC ............ B60H 1/00285; B60H 1/00499; B60H 1/00742; B60H 1/00971; B60H 2001/003; B60N 2/002; B60N 2/56; B60N 2/5628; B60N 2/5657; B60N 2/5678
  USPC .......................................................... 701/36
  See application file for complete search history.

(56) References Cited

U.S. PATENT DOCUMENTS 7,962,441 B2 * 6/2011 Kojima .............. B60H 1/00735
                                                              706/62
9,744,889 B2 * 8/2017 Kawashima ....... B60H 1/00285
(Continued)

FOREIGN PATENT DOCUMENTS

CA       2644887 A1 *  6/2009   ........... B60N 2/0244
CN     114425977 A  *  5/2022
(Continued)

OTHER PUBLICATIONS

Vinoth, et al., "Automated car safety seat cooling system using thermoelectric cooler," 2014 International Conference on Computation of Power, Energy, Information and Communication (ICCPEIC), Chennai, India, 2014, pp. 488-493, (https://ieeexplore.ieee.org/document/6915413) (Year: 2014).*

(Continued)

*Primary Examiner* — Atul Trivedi
(74) *Attorney, Agent, or Firm* — Haley Guiliano LLP

(57) ABSTRACT

Systems and methods are provided for determining, by processing circuitry, a vehicle occupant has left a seat of a vehicle (or the seat is unoccupied), and in response to determining the vehicle occupant has left the seat (or the seat is unoccupied), causing a heating, ventilation, and air conditioning (HVAC) system of the vehicle to thermally store energy in the seat.

20 Claims, 10 Drawing Sheets

(56) References Cited

U.S. PATENT DOCUMENTS

| | | | |
|---|---|---|---|
| 10,675,943 B2* | 6/2020 | Filipkowski | B60H 1/00735 |
| 11,279,206 B1* | 3/2022 | Mueller | B60H 1/247 |
| 11,338,641 B2* | 5/2022 | Hendry | B60K 35/22 |
| 11,397,014 B2* | 7/2022 | Bhosale | F24F 11/84 |
| 11,535,131 B1* | 12/2022 | Feltham | B60N 2/5628 |
| 2004/0069444 A1* | 4/2004 | Clifford | B60H 1/00678 |
| | | | 165/41 |
| 2005/0268621 A1* | 12/2005 | Kadle | B60H 1/00285 |
| | | | 62/3.2 |
| 2009/0250980 A1* | 10/2009 | Major | B60N 2/5692 |
| | | | 297/180.15 |
| 2010/0236770 A1* | 9/2010 | Pursifull | B60H 1/00764 |
| | | | 165/202 |
| 2011/0166747 A1* | 7/2011 | Wijaya | B60H 1/00742 |
| | | | 165/203 |
| 2012/0090814 A1* | 4/2012 | Crosier | B60H 1/00207 |
| | | | 165/59 |
| 2012/0312520 A1* | 12/2012 | Hoke | B60N 2/5628 |
| | | | 219/217 |
| 2013/0037252 A1* | 2/2013 | Major | B60H 1/00742 |
| | | | 165/237 |
| 2013/0232996 A1* | 9/2013 | Goenka | B60H 1/00742 |
| | | | 62/3.61 |
| 2015/0025738 A1* | 1/2015 | Tumas | B60H 1/00742 |
| | | | 701/36 |
| 2015/0056906 A1* | 2/2015 | Fujii | B60N 2/5628 |
| | | | 454/75 |
| 2015/0136376 A1* | 5/2015 | Niemann | B60H 1/00785 |
| | | | 165/222 |
| 2016/0325655 A1* | 11/2016 | Joshi | B60N 2/5657 |
| 2017/0182861 A1* | 6/2017 | Steinman | B60H 1/00028 |
| 2018/0009288 A1* | 1/2018 | Bhasin | F24F 11/30 |
| 2018/0022181 A1* | 1/2018 | Sawyer | B60H 1/00328 |
| | | | 62/79 |
| 2018/0134120 A1* | 5/2018 | Marginean | B60H 1/3407 |
| 2018/0162191 A1* | 6/2018 | Lee | B60H 1/00842 |
| 2018/0215293 A1* | 8/2018 | Gandhi | B60N 2/5678 |
| 2018/0265094 A1* | 9/2018 | Graney | B60K 35/654 |
| 2019/0077217 A1* | 3/2019 | Yu | B60H 1/00778 |
| 2019/0092119 A1* | 3/2019 | Tsunoda | B60N 2/995 |
| 2020/0094651 A1* | 3/2020 | Ostrowski | G06N 20/00 |
| 2020/0101818 A1 | 4/2020 | Holmstrom et al. | |
| 2020/0148032 A1 | 5/2020 | Skapof et al. | |
| 2020/0180387 A1* | 6/2020 | Sarma | B60H 1/00007 |
| 2020/0362808 A1 | 11/2020 | Cosgrove et al. | |
| 2021/0018202 A1* | 1/2021 | Atchison | F24F 11/37 |
| 2021/0053421 A1* | 2/2021 | Chiritescu | B60H 1/2218 |
| 2021/0070132 A1* | 3/2021 | Kwon | B60H 1/00392 |
| 2021/0170827 A1* | 6/2021 | Jeong | B60H 1/00907 |
| 2021/0188035 A1* | 6/2021 | Marshall | B60H 1/00664 |
| 2023/0191871 A1* | 6/2023 | Feltham | B60N 2/5678 |
| | | | 701/36 |
| 2023/0191873 A1 | 6/2023 | Feltham | |
| 2023/0302871 A1* | 9/2023 | Makita | B60N 2/5657 |
| 2024/0017591 A1* | 1/2024 | Feltham | B60H 1/247 |

FOREIGN PATENT DOCUMENTS

| | | | | |
|---|---|---|---|---|
| DE | 102019111731 A1 | * | 12/2019 | B60H 1/00742 |
| GB | 2612049 A | * | 4/2023 | B60H 1/0075 |
| JP | 2004283403 A | * | 10/2004 | B60H 1/00285 |
| JP | 3714261 B2 | * | 11/2005 | B60H 1/00285 |
| KR | 100331744 B1 | * | 5/2002 | |
| KR | 100601834 B1 | * | 7/2006 | |
| KR | 20060106507 A | * | 10/2006 | |
| KR | 20080010670 A | * | 1/2008 | |
| KR | 20080042220 A | * | 5/2008 | |
| KR | 20080051412 A | * | 6/2008 | |
| KR | 20090036370 A | * | 4/2009 | |
| KR | 20100006962 A | * | 1/2010 | |
| KR | 20100007431 A | * | 1/2010 | |
| KR | 20100042316 A | * | 4/2010 | |
| KR | 20110030798 A | * | 3/2011 | |
| KR | 101200755 B1 | * | 11/2012 | |
| KR | 101201299 B1 | * | 11/2012 | |
| KR | 101201301 B1 | * | 11/2012 | |
| WO | WO-2006117690 A2 | * | 11/2006 | B60N 2/5635 |
| WO | WO-2012066226 A1 | * | 5/2012 | B60K 1/04 |
| WO | WO-2020065205 A1 | * | 4/2020 | B60H 1/00478 |
| WO | WO-2020065219 A1 | * | 4/2020 | |
| WO | WO-2020108858 A1 | * | 6/2020 | B60H 1/00357 |
| WO | WO-2021112129 A1 | * | 6/2021 | A47C 7/748 |
| WO | WO-2022190474 A1 | * | 9/2022 | B60N 2/0034 |
| WO | WO-2023244758 A1 | * | 12/2023 | A61H 23/00 |

OTHER PUBLICATIONS

Farzaneh, et al., "Intelligent control of thermal comfort in automobile," 2008 IEEE Conference on Cybernetics and Intelligent Systems, Chengdu, China, 2008, pp. 510-514, doi: 10.1109/ICCIS.2008.4670809. (https://ieeexplore.ieee.org/document/4670809) (Year: 2008).*

Ates, et al., "Heating and cooling vehicle seat via air conditioner coils," EPJ Web of Conferences 213, 02009 (2018), pp. 1-11 (https://www.epj-conferences.org/articles/epjconf/pdf/2019/18/epjconf_efm18_02009.pdf) (Year: 2018).*

ClimateSense™ | Personal Climate Control—Gentherm "https://web.archive.org/web/20211017034510/https://gentherm.com/en/solutions/automotive/climatesense," Oct. 17, 2021.

* cited by examiner

VEHICLE SEAT FOR STORING THERMAL ENERGY FOR OCCUPANT COMFORT

CROSS-REFERENCE TO RELATED APPLICATIONS

This application claims the benefit of U.S. Provisional Application No. 63/291,202 filed Dec. 17, 2021, the disclosure of which is hereby incorporated by reference herein in its entirety. In addition, the disclosure of commonly owned application Ser. No. 17/959,529, filed Oct. 4, 2022 and entitled "ADAPTIVE VEHICLE HVAC SYSTEM DEPENDENT ON OPERATOR LOCATION RELATIVE TO VEHICLE," which claims the benefit of Provisional Application No. 63/291,199, is hereby incorporated by reference herein in its entirety.

INTRODUCTION

Many delivery drivers (e.g., employed or contracted by e-commerce companies) spend up to 10 hours per day, and 4-5 days a week, delivering packages to consumers or businesses. In performing these deliveries, the vehicle doors may be opened and closed hundreds of times per day, the location of the vehicle may change often, and the vehicle may be exposed to various thermal operating environments and conditions, ranging from extreme hot with high sun, to extreme cold. Under such circumstances, it may be difficult to efficiently maintain thermal conditions for the vehicle.

SUMMARY

Accordingly, systems, vehicles and methods are disclosed herein for efficiently maintaining the thermal conditions of electric vehicles. In some embodiments, a vehicle is provided which comprises a heating, ventilation, and air conditioning (HVAC) system, and processing circuitry configured to determine a vehicle occupant has left a seat of the vehicle, and, in response to determining the vehicle occupant has left the seat, cause the HVAC system to thermally store energy in the seat. In some embodiments, the HVAC system may comprise such processing circuitry.

In some embodiments, an HVAC system of a vehicle is provided, comprising input/output (I/O) circuitry configured to receive a sensor signal that indicates whether a seat of the vehicle is unoccupied, and processing circuitry configured to determine, based on the sensor signal, the seat is unoccupied, and in response to determining that the seat is unoccupied, cause the HVAC system to thermally store energy in the seat.

In some embodiments, the processing circuitry is further configured to determine an ambient temperature in an environment of the vehicle, and cause the HVAC system to thermally store energy in the seat based at least in part on the ambient temperature.

In some embodiments, the processing circuitry is further configured to determine an ambient temperature in an environment of the vehicle, determine a door of the vehicle is left open, and cause the HVAC system to thermally store energy in the seat based at least in part on the ambient temperature and the door of the vehicle left open.

In some embodiments, the HVAC system is configured to provide conditioned air, and the processing circuitry is configured to cause the HVAC system to thermally store energy in the seat by causing at least a portion of the conditioned air to the seat.

In some embodiments, the processing circuitry is further configured to modify a temperature setpoint of the HVAC system, and cause the HVAC system to thermally store energy in the seat based at least on the modified temperature setpoint.

In some embodiments, the processing circuitry is further configured to determine an input specifying a preferred heating or cooling setting for the seat, and cause the HVAC system to thermally store energy in the seat based at least in part on the input.

In some embodiments, the processing circuitry is further configured to determine the vehicle occupant has returned to the seat after leaving the seat, and in response to determining the vehicle occupant has returned to the seat, cease the storage of thermal energy in the seat immediately or after a predefined period of time.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
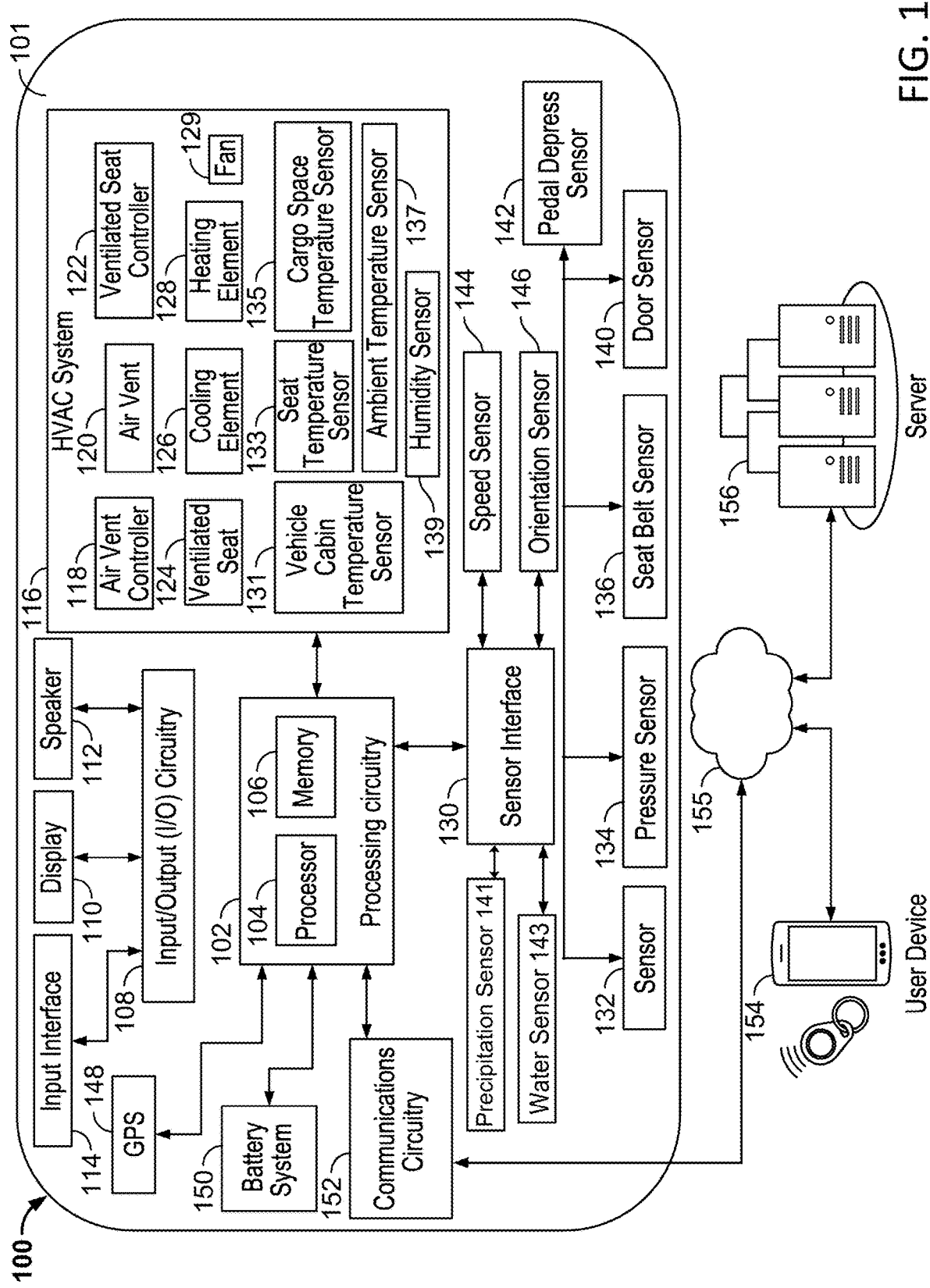
FIG. 1 shows a block diagram of an illustrative system for causing an HVAC system of a vehicle to thermally store energy in a vehicle seat, in accordance with some embodiments of the present disclosure.

FIG. 1 shows a block diagram of an illustrative system 100 for causing an HVAC system of a vehicle to thermally store energy in a vehicle seat, in accordance with some embodiments of the present disclosure. System 100 may comprise vehicle 101, one or more of user device 154 (e.g., a key fob; a mobile device, such as, for example, a smart phone or a tablet; or any other suitable computing device, such as, for example a laptop computer, a desktop computer; or any combination thereof) and cloud computing resources 156 (e.g., one or more remote servers, which may include and/or maintain and/or be in communication with one or more databases).

Such elements of system 100 may be configured to communicate over any suitable wireless communication path. For example, user device 154 may be configured to communicate with vehicle 101 using a short-range radio communication technique, such as, for example, Bluetooth or near-field communication (NFC) and/or any other suitable technique, and vehicle 101 may communicate with user device 154 and server 156 over network 155, e.g., the Internet, a local area network, a wide area network, a satellite network, a cellular network, or any other suitable network, or any combination thereof. In some embodiments, user device 154 may be configured to implement a mobile application (e.g., provided by and/or associated with a manufacturer of vehicle 101) that allows a user to access a user profile and specify certain settings or preferences of the user profile, e.g., preferred HVAC settings, preferred thermal settings for a vehicle component (e.g., a ventilated seat or steering wheel, other any other suitable component to which thermal energy may be directed) or any other suitable settings, or any combination thereof.

Vehicle 101 may be a car (e.g., a delivery truck, a delivery van, a delivery car, a coupe, a sedan, a truck, an SUV, a bus, or any other suitable type of car, or any combination thereof), a motorcycle, an aircraft (e.g., a drone, or any other suitable type of aircraft), a watercraft (e.g., a boat or any other suitable type of watercraft), or any other suitable type of vehicle, or any combination thereof. In some embodiments, vehicle 101 may be configured to operate autonomously or semi-autonomously. Vehicle 101 may comprise processing circuitry 102 which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Processing circuitry 102 may be communicatively connected to components of vehicle 101 via one or more wires, or via wireless connection. In some embodiments, the processor 104 may include one or more processors such as, for example, a central processing unit having a single core or dual core, bus, logic circuitry, integrated circuitry, digital signal processor, graphics processor, an embedded processing device, any other suitable components for reading and executing computer instructions, or any combination thereof. Processing circuitry 102 may monitor sensor signals, generate control signals, execute computer readable instructions, receive inputs, perform any other suitable actions, or any combination thereof.

Memory 106 may comprise hardware elements for non-transitory storage of commands or instructions, that, when executed by processor 104, cause processor 104 to operate vehicle 101 in accordance with embodiments described above and below. Memory 106 may include any suitable storage device such as, for example, volatile memory, non-volatile memory, a removable storage device, a solid-state storage device, an optical device, a magnetic device, any other suitable component, or any combination thereof, for storing information.

Processing circuitry 102 may be communicatively connected to input interface 114 (e.g., a steering wheel, a touch screen display, buttons, knobs, a microphone or other audio capture device, or any other suitable input interface, or any combination thereof) via input/output (I/O) circuitry 108. In some embodiments, a driver or other occupant of vehicle 101 may be permitted to select certain settings in connection with the operation of vehicle 101 via input interface 114, e.g., thermal storage settings for a vehicle component, HVAC settings, or any other suitable settings, or any combination thereof. In some embodiments, a driver or other occupant of vehicle 101 may be permitted to provide inputs by way of input interface 114, e.g., via user selection of an icon on a touchscreen display on vehicle 101, via selection of a button or switch at a dashboard of vehicle 101, via voice command received by a microphone of vehicle 101, via tactile input, via user device 154, or via any other suitable input, or any combination thereof. In some embodiments, a vehicle occupant may be understood as a human (e.g., a driver or passenger of vehicle 101 capable of providing inputs via input interface 114), a computer or robot (e.g., in the case of vehicle 101 being autonomous or semi-autonomous), an animal (e.g., pets), or any other suitable vehicle occupant.

Processing circuitry 102 may be communicatively connected to display 110 and speaker 112 by way of I/O circuitry 108. Display 110 may be located at a dashboard of vehicle 101 and/or at a heads-up display at a windshield of vehicle 101, or at any other suitable location, or any combination thereof. Display 110 may comprise an LCD display, an OLED display, an LED display, or any other suitable type of display, or any combination thereof. Display 110 may be configured to display HVAC settings thermal storage settings for a vehicle component, and/or selectable identifiers associated with user profiles of a particular user account or user account associated with vehicle 101, or any other suitable content, or any combination thereof. Speaker 112 may be located at any suitable location within vehicle 101, e.g., at a dashboard of vehicle 101, on an interior portion of the vehicle door, in a cargo portion of vehicle 101, or any combination thereof, and may be configured to provide audio output to a driver and/or occupant 312 is out of vehicle 101.

Vehicle 101 may comprise HVAC system 116. Processing circuitry 102 may be communicatively connected to HVAC system 116. HVAC system 116 may comprise any of one or more of heating, ventilation, or air conditioning components, or any other suitable components, or any combination thereof, configured to maintain thermal comfort in vehicle 101 and/or control humidity of air in an interior of vehicle 101. In some embodiments, HVAC system 116 may comprise one or more of a variety of components (e.g., a compressor, a condenser, a fan, valving (e.g., controllable and/or fixed), a blower, an evaporator, a radiator, heat exchangers, a heater (e.g., a positive temperature coefficient (PTC) heater), a chiller, an expansion valve, a recirculation system, an air mixing portion, or any other suitable component, or any combination thereof). In some embodiments, one or more of such components of HVAC system 116 may be configured to process a working fluid (e.g., any suitable refrigerant, coolant, or other fluid) and provide conditioned air (e.g., having its temperature and/or humidity modified) to any suitable portion of vehicle 101 and/or ventilated seat 124. Additionally or alternatively, HVAC system 116 may comprise ventilation elements, e.g., use fans, blowers or ducts to circulate air and/or bring fresh air inside vehicle 101, where such air may or may not be conditioned, and/or may be used to reduce moisture of air within vehicle 101. In some embodiments, HVAC system 116 may employ any suitable sensor, e.g., current sensors (e.g., of a compressor motor) to measure an output power of HVAC system 116. In some circumstances, HVAC system 116 may be configured to provide heating and ventilation, without providing air conditioning; in some circumstances, HVAC system 116 may be configured to provide air conditioning and ventilation, without providing heating.

HVAC system 116 may be configured to provide cabin cooling (e.g., air conditioning), heating, defrosting, venting, or any suitable combination thereof. HVAC system 116 may include a blower fan, ducting, plenums, dampers or diversion valves, filters, intakes, one or more input interfaces (e.g., knobs, hard buttons, soft buttons, touchscreen interfaces, voice interfaces), a controller, any other suitable components, or any combination thereof. HVAC system 116 may comprise air vent controller 118, air vent 120, ventilated seat controller 122, ventilated seat 124, cooling element 126, heating element 128, fan 129, vehicle cabin temperature sensor 131, seat temperature sensor 133, cargo space temperature sensor 135, ambient temperature sensor 137, humidity sensor 139, and/or any other suitable components, or any combination thereof. Although only a single component for such elements is shown, HVAC system 116 may include any number of such components. In some embodiments, air vent controller 118 and/or ventilated seat controller 122 may be implemented in a similar manner as processing circuitry 102.

HVAC system 116 may comprise one or more air vents 120. Processing circuitry 102 may be communicatively connected (e.g., via air vent controller 118) to air vent 120. Air vent 120 may be configured to direct conditioned air from HVAC system 116 to different portions of vehicle 101 (e.g., a vehicle cabin, a vehicle cargo space, a vehicle seat, or any other suitable portions of vehicle 101, or any combination thereof). In some embodiments, air vent 120 may include fins which may be moved (e.g., rotated or translated) via at least one motor or actuator. In some embodiments, fins of the vent can be oriented to direct air from the vent into any suitable direction inside vehicle 101.

In some embodiments, air vent controller 118 and/or ventilated seat controller 122 and/or processing circuitry 102 may be configured to, in response to determining that a vehicle occupant has left ventilated seat 124 (or in response to determining ventilated seat 124 is unoccupied), cause HVAC system 116 to thermally store energy in seat 124. For example, processing circuitry 102 may cause (e.g., directly or via ventilated seat controller 122) the modification of a temperature setpoint and/or airflow intensity or any other suitable parameter associated with thermal energy being provided to ventilated seat 124. In some embodiments, modifying the temperature setpoint, airflow intensity or other parameter may be understood as increasing or decreasing a value or setting for such temperature setpoint, airflow intensity or other parameter. In some embodiments, such modification may be based on current ambient conditions in an environment of vehicle 101, e.g., inside and/or outside vehicle 101. In some embodiments, processing circuitry 102 may cause (e.g., directly or via ventilated seat controller 122) ventilated seat 124 to begin storing more thermal energy than an amount of energy that was being stored prior to determining that the occupant left vehicle seat 124, e.g., when occupant was still detected to be sitting in vehicle seat 124. In some embodiments, ventilated seat 124 may not be storing thermal energy at all prior to processing circuitry 102 determining that that the occupant left vehicle seat 124, or may be storing an amount of energy that is determined to be insufficient to provide thermal comfort to the vehicle occupant upon his or her return. In some embodiments, such adjustment may be based on a selection received from a user, e.g., via user device 154 and/or received via I/O circuitry 108 of vehicle 101, of a specific temperature value or setting or other selection associated with ventilated seat 124.

In some embodiments, the one or more retrieved parameters of HVAC system 116 for performing the modification may correspond to particular setpoints for one or more of temperature, flow rate, humidity, air flow direction, or any other suitable parameter, or any combination thereof. In some embodiments, air vent controller 118 and/or ventilated seat controller 122 and/or processing circuitry 102 may be configured to determine the current HVAC system parameters (e.g., current setpoints for one or more of temperature, flow rate, humidity, air flow direction, or any other suitable parameter, or any combination thereof). Air vent controller 118 and/or ventilated seat controller 122 and/or processing circuitry 102 may cause HVAC system 116 to modify or adjust such current HVAC system parameters based on the one or more retrieved parameters of the HVAC system. In some embodiments, the one or more retrieved parameters of HVAC system 116 may depend on current ambient conditions, inside and/or outside vehicle 101. In some embodiments, the one or more retrieved setpoints may correspond to a desired or target value of a parameter to be detected within vehicle 101, or a desired or target value of a parameter to be output by HVAC system 116, and such one or more retrieved setpoints may be selected based on current ambient conditions (e.g., humidity and/or temperature measurements within vehicle 101, and/or humidity and/or temperature measurements outside vehicle 101).

As an example, an evaporator of HVAC system 116 may be employed in conjunction with a blower to dry air and reduce humidity in association with vehicle seat 124, e.g., until a desired humidity setpoint, which may be specified for the current ambient conditions, is detected within vehicle 101 or is output by HVAC system 116 for a certain period of time. Additionally or alternatively, a heater, e.g., heating element 128, may be configured to provide hot air to a suitable portion of the vehicle (e.g., seat 124) at a particular temperature and/or flow rate, e.g., at which the user's clothing may be situated, in accordance with a temperature setpoint and/or a flow rate setpoint given the current ambient conditions, and/or a fan blower may be configured to blow air towards a specific portion of the vehicle and/or clothing or body part of the user. In some embodiments, a predetermined period of time during which the modification should be maintained (e.g., prior to the vehicle occupant's return or after the vehicle occupant's return) may be stored and referenced (e.g., at memory 106), where such period of time may be based on determined ambient conditions and/or other sensor inputs. In some embodiments, such one or more parameters of HVAC system 116 may be retrieved, and the adjustment of the current HVAC parameters may be performed, while the user is outside the vehicle, e.g., the adjusting may be performed automatically based on the location of the occupant and/or other suitable factors, or the user may instruct the adjusting to be performed while outside the vehicle, e.g., via a mobile device.

In some embodiments, the adjusting of the HVAC parameters within vehicle 101 may be performed for a predetermined period of time, the duration of which may depend on one or more factors. For example, processing circuitry 102 may reference a lookup table storing relationships between a duration of time and current ambient conditions, e.g., a higher humidity level being measured may indicate a longer period of time should be employed, such as to dry seat 124, as compared to when a lower humidity level is measured. In some embodiments, the predetermined period of time may correspond to a period of time required to cause a setpoint within vehicle 101 to reach a target value, or a period of time for which a setpoint of a parameter output by HVAC system 116 should be applied at a certain value. Additionally or alternatively, if a material (e.g., seat 124 or clothing of a user and/or any other suitable material) is determined to be of a particular wetness, the predetermined period of time may be indicated in the lookup table and may correspond to a period of time to dry the particular material having the determined wetness level. For example, a high wetness level may suggest that more time is needed for storing thermal energy in seat 124. As another example, the user may be prompted to indicate when he or she wishes to end the adjusting of the parameters such as when he or she is satisfied with the extent of the drying.

In some embodiments, adjusting a parameter of HVAC system 116 based on determining that a vehicle occupant has left ventilated seat 124 of vehicle 101 (or based on determining that ventilated seat 124 is unoccupied) may comprise directing thermal energy towards particular portion(s) and/or certain components of vehicle 101, to maintain a comfortable environment, e.g., for when the vehicle occupant re-enters vehicle 101. For example, processing circuitry 102 may cause the HVAC system to direct thermal energy by using seat 124, a steering wheel of vehicle 101 (an example of input interface 114), or any other suitable component, or any combination thereof, of vehicle 101 to direct the thermal energy.

In some embodiments, vehicle 101 may receive input, e.g., via a single button push received via display 110, such as, for example, on an XMM screen of an HVAC tab, or a dashboard of vehicle 101, or at user device 154 (e.g., when the user is inside or outside the vehicle), a voice command received via input interface 114 (e.g., a microphone) or user device 154, or any other suitable input, or any combination thereof, regarding adjusting a parameter of vehicle 101 and/or indicating a particular portion of vehicle 101 for which thermal energy should be directed. For example, the user may decide to provide such input if the user is about to exit the vehicle to perform a delivery and anticipates being wet upon his or her return to the vehicle (e.g., due to current weather conditions such as ongoing precipitation being observed by the user), is not wearing waterproof clothing, or any other suitable motivation, or any combination thereof.

In some embodiments, HVAC system 116 may be caused by processing circuitry 102 or any other suitable controller 118 or 122 to automatically (e.g., regardless of whether user input is received) adjust a parameter of HVAC system 116 in response to determining that a vehicle occupant has left ventilated seat 124 of vehicle 101 (or based on determining that ventilated seat 124 is unoccupied). For example, such automatic adjustment may take into account a location of a user, determined based on signals received from any suitable sensor(s), to determine whether a user has left ventilated seat 124 of vehicle 101 and/or is currently outside vehicle 101 or a portion thereof, e.g., after having been inside vehicle 101, or that ventilated seat 124 is otherwise unoccupied. In some embodiments, processing circuitry 102 may determine which portion of vehicle 101 the vehicle occupant is located at, e.g., a cabin or a cargo portion of vehicle, which may impact the parameter retrieved for the adjusting of HVAC system 116.

In some embodiments, HVAC system 116 may, in conjunction with the determined location of the user, take into account determined ambient conditions of an environment of vehicle 101. For example, HVAC system 116 may determine that weather conditions indicate on-going or imminent precipitation and/or extreme weather (e.g., very cold temperatures, such as, for example, below a particular threshold), and/or based on receiving sensor signals indicating that a vehicle component and/or other object or material in vehicle 101 or occupant in vehicle 101 is wet. For example, HVAC system 116 may determine, based on sensor signals received from precipitation sensor 141, which may be positioned at a windshield of vehicle 101 or any other suitable location, that the current weather corresponds to rain, snow, sleet, hail, etc. In such a circumstance, it may be desirable to adjust HVAC parameters (e.g., while a vehicle occupant is outside vehicle 101, such as to dry an already wet seat or in anticipation of a wet seat upon the occupant's return) in preparation for the return of the vehicle occupant to vehicle 101 to maintain optimal thermal conditions. In some embodiments, precipitation sensor 141 may be a rain-light sensor or rain sensor. In some embodiments, precipitation sensor 141 may be an optical sensor, infrared sensor, an ultrasound sensor, or any other suitable sensor or any combination thereof. As an example, precipitation sensor 141 may measure an amount of light reflected from the windshield to precipitation sensor 141, where less light being reflected than a threshold, or a change in the amount of reflected light measured by precipitation sensor 141, may indicate that raindrops and/or other precipitation is present on the windshield, as the raindrops may divert the path of light from returning to the sensor. In some embodiments, parameter adjustment may be triggered at least in part based on determining that precipitation is currently heavy, e.g., based on readings of precipitation sensor 141.

For example, if processing circuitry 102 and/or HVAC system 116 receives an indication that precipitation sensor 141 has detected currently occurring precipitation (or in some cases, imminent or recent precipitation), processing circuitry 102 and/or HVAC system 116 may determine that a user was exposed to precipitation. For example, a user may be determined as having been exposed to precipitation if user is detected to currently be outside vehicle 101 and thus exposed to the precipitation. In some embodiments, images of the environment outside vehicle 101 may be captured and processed, e.g., to identify potential puddles near the vehicle or other conditions suggesting the user's clothing may become wet upon his or her return, such as, for example, after a delivery, or based on any other suitable factor, or any combination thereof, and parameter adjustment may be performed based at least in part on such processed images.

As another example, water sensor 143 may be included in or around particular portions of vehicle 101 and/or vehicle components, such as seat 124 (e.g., at seat back rest cushion 311 and/or seat bottom cushion 309) and/or at a floor in a vicinity of a seat, to determine whether water is present in or around seat 124 or in or around any other suitable particular portion of vehicle 101. The adjusting of HVAC parameters may be triggered at least in part based on if water is determined to be present (e.g., if any water is detected at all, or water is detected to be above a threshold amount) at the seat or other portion of vehicle 101. In some embodiments, water sensor 143 may detect the presence of water based on measuring a decreased resistance between two electrodes, e.g., based on the electrical conductivity of water, or water sensor 143 may be capacitance-based such that a change in capacitance may indicate the presence of water, or any other suitable water or wet sensor may be employed. Additionally or alternatively, vehicle 101 may determine, based on signals from ambient temperature sensor 137 and/or weather information received from server 156 and/or weather information received from user device 154, that an occupant is likely to be wet (e.g., based on forecasted or current precipitation, or due to hot temperatures and/or high humidity such that the user is likely to perspire while the user is out of the vehicle), upon his or her return to vehicle 101. In some embodiments, HVAC system 116 and/or processing circuitry 102 may cause a notification to be provided to a user indicating that adjustment of parameters has been automatically performed, and may provide an option to the user to revert to prior HVAC settings and/or indicate whether such adjustment should be automatically performed in future similar instances.

Ventilated seat 124 for vehicle 101 may be configured (e.g., via ventilated seat controller 122, which may be communicatively connected to processing circuitry 102) to efficiently maintain thermal conditions of vehicle 101, to provide thermal comfort, e.g., heating or cooling, to a vehicle occupant that is sitting or otherwise located at ventilated seat 124. In some embodiments, ventilated seat 124 may comprise a seat cushion assembly (e.g., a bottom cushion 309 and/or a seat back rest cushion 311 of FIG. 3A) and an air duct configured to provide conditioned air, from HVAC system 116 to the seat cushion assembly. In some embodiments, ventilated seat 124 may comprise heating element 128, which may be configured to provide heating to an occupant of ventilated seat 124, e.g., by applying electric current through a wire or coil of heating element 128 to generate heat. In some embodiments, cooling may be provided to ventilated seat 124 via cooling element 126, which may utilize working fluids or refrigerant to provide such cooling. In some embodiments, ventilated seat 124 may comprise or be associated with seat temperature sensor 133, which may be configured to measure a temperature in one or more portions of ventilated seat 124. In some embodiments, one or more of fan 129, a blower, or a duct, or any other suitable equipment, or any combination thereof, may be disposed within ventilated seat 124 to heat or cool ventilated seat 124. For example, air may be configured to pass through small perforations or pores of seat 124, and/or modify a moisture or humidity level of the air. In some embodiments, one or more portions of HVAC system 116 may be connected to ventilated seat 124 via a duct, or any other suitable conduit, as discussed in more detail in commonly-owned application Ser. No. 17/390,710 to Feltham et al., the contents of which are hereby incorporated by reference herein in their entirety. For example, such aspects may (or may not) allow humidity associated with ventilated seat 124 to be adjusted.

In some embodiments, the adjusting of the parameters, which may be triggered at least in part by determining that a vehicle occupant has left a vehicle cabin of vehicle 101 (or based on determining that the vehicle cabin is unoccupied), may be operable to direct thermal energy to seat back rest cushion 311 and/or seat bottom cushion 309, of a driver seat, occupant seat or passenger seat of the vehicle. This may enable drying, and/or conditioning air in a vicinity of, seat 124, a jacket and/or shirt and/or torso of the occupant, and/or pants or shorts or a bathing suit of the occupant, upon his or her return to vehicle 101. In some embodiments, such aspects may enable drying any suitable material, e.g., towels, blankets, hats, or occupant (e.g., persons or pets) which the user may place in a desired portion of vehicle 101 (e.g., when the user leaves vehicle 101). In some embodiments, adjusting of the parameters may be automatically performed based on one or more sensor inputs, e.g., indicating that a particular portion of vehicle 101 is wet and/or detecting the presence and/or wetness of an object or material or person or animal at such particular portion of the vehicle 101.

Vehicle cabin temperature sensor 131 may be configured to monitor a temperature of a cabin portion of vehicle 101, cargo space temperature sensor 135 may be configured to monitor a temperature of a cargo space portion of vehicle 101, and ambient temperature sensor 137 may be configured to monitor an ambient temperature of an environment outside vehicle 101 (and/or within vehicle 101). In some embodiments, temperature sensors 131, 133, 135, 137 may comprise a thermocouple, thermistor, resistance temperature detector, or optical sensor, or any suitable combination thereof. In some embodiments, HVAC system 116 may comprise sensors configured to measure temperature of a component (e.g., a heat exchanger, a chiller, a compressor), a fluid (e.g., air, coolant, or refrigerant), or a combination thereof. In some embodiments, HVAC system 116 may comprise sensors configured to measure pressure or a difference in pressure of a fluid (e.g., air, coolant, or refrigerant). In some embodiments, HVAC system 116 may comprise sensors configured to measure a flow rate in air, coolant, or refrigerant (e.g., to determine a cooling or heating rate).

Humidity sensor 139 may be configured to determine a current humidity level associated with ventilated seat 124 and/or within a cabin (e.g., driver zone or vehicle cabin 302 of FIG. 3A) of vehicle 101 in a vicinity of seat 124 (and/or outside vehicle 101 and/or at cargo zone 306 of FIG. 3A), and may correspond to any suitable sensor or device configured to measure an absolute humidity, the amount of water vapor in the air of vehicle 101 (or a specific portion of vehicle 101), and/or a relative humidity, the amount of water vapor or moisture in the air expressed as a fraction or percentage of a maximum humidity at a given temperature, and/or a specific humidity. In some embodiments, humidity sensor 139 may be capacitive-based, resistive-based, thermal-based, or may be of any other suitable type, or any combination thereof. In some embodiments, based on the value output by humidity sensor 139, HVAC parameters may be adjusted in accordance with parameters or setpoints (e.g., based on determining ventilated seat 124 of vehicle 101 is unoccupied or that the occupant has left ventilated seat 124 of vehicle 101). For example, an evaporator and/or blower of HVAC system 116 may be used to dehumidify the air of a cabin of vehicle 101, based on the retrieved HVAC parameters, where such dehumidification may also cause cooling of the vehicle cabin or portions thereof. In some embodiments, one or more of such sensor signals may be used as a signal indicative of whether one or more vehicle occupants have left vehicle 101, or that vehicle 101 is otherwise unoccupied at a current time.

Processing circuitry 102 may be communicatively connected (e.g., by way of sensor interface 130) to sensor 132, pressure sensor 134, seat belt sensor 136, door sensor 140, pedal depress sensor 142, speed sensor 144, orientation sensor 146, precipitation sensor 141, water sensor 143 and/or any other suitable sensor, and/or any suitable combination thereof. Sensor 132 may comprise one or more image sensors (e.g., a CMOS or CCD) configured to capture an internal or external environment of vehicle 101. Pressure sensor 134 (e.g., piezo or strain-based transducers) may be an occupant detection sensor positioned at one or more vehicle seats (e.g., ventilated seat 124) and may be configured to sense whether a vehicle occupant is present in a vehicle seat. Seat belt sensor 136 may be configured to output a signal to processing circuitry 102 (e.g., via sensor interface 130) indicative of whether a seat belt of a vehicle occupant is engaged or buckled. Door sensor 140 may be configured to output a signal to processing circuitry 102 (e.g., via sensor interface 130) indicative of whether a door of vehicle 101 is open or closed, or partially open. Pedal depress sensor 142 may be configured to output a signal to processing circuitry 102 (e.g., via sensor interface 130) indicative of whether a brake pedal or accelerator pedal is depressed. Such sensor outputs may be utilized by processing circuitry 102 to determine whether a vehicle occupant is present in a vehicle seat of vehicle 101, or any other suitable portion of vehicle 101, or any combination thereof. In some embodiments, a current vehicle state (e.g., park or in drive) may be utilized to infer a location of the vehicle occupant. In some embodiments, determining that one or more actions (e.g., putting the vehicle is park, taking off seat belt) have been performed may trigger a cargo door to be automatically opened (e.g., to enable the vehicle occupant to retrieve a package for delivery).

Orientation sensor 146 may be an inclinometer, an accelerometer, a tiltmeter, any other pitch sensor, or any combination thereof and may be configured to provide vehicle 101 orientation values (e.g., vehicle's pitch and/or vehicle's roll) to processing circuitry 102. Speed sensor 144 may be one of a speedometer, a GPS sensor, a rotary encoder, or the like, or any combination thereof, and may be configured to provide a reading of the vehicle's current speed to processing circuitry 102. Such sensor outputs may be used to determine whether vehicle 101 is being operated or is stopped.

Processing circuitry 102 may be communicatively connected to communications circuitry 152. Communications circuitry 152 may comprise any suitable hardware and/or software operable to send and receive wired and/or wireless signals between vehicle 101 and external devices such as, for example, network or user devices (e.g., user device 154, server 156, and/or a Wi-Fi access point and/or a satellite) and/or any other suitable computing devices. Communications circuitry 152 may include an antenna and other control circuitry (e.g., protocol converters, rate converters, signal converters), or any combination thereof.

Processing circuitry 102 may be communicatively connected to battery system 150, which may be configured to provide power to one or more of the components of vehicle 101 during operation. In some embodiments, vehicle 101 may be an electric vehicle or a hybrid electric vehicle, and/or may be configured to be an autonomous or semi-autonomous vehicle. Processing circuitry 102 may be communicatively connected to GPS system 148 or other positioning device of vehicle 101, where the driver or operator may interact with GPS system 148 via input interface 114. GPS system 148 may be in communication with (e.g., via communications circuitry 152) one or more satellites and/or servers remote from vehicle 101 to ascertain a location of vehicle 101 and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with vehicle 101 (e.g., a location of a home of the user stored in memory 106), or any other suitable form, or any combination thereof.

It should be appreciated that FIG. 1 only shows some of the components of vehicle 101, and it will be understood that vehicle 101 also includes other elements commonly found in vehicles (e.g., electric vehicles or any other suitable vehicle), e.g., a motor, brakes, wheels, wheel controls, turn signals, windows, doors, etc.

User device 154 may be, for example, a smartphone, tablet or any suitable personal computing device operable to communicate with vehicle 101 and server 156, via wireless network or wired connection (e.g., via a USB connection or other data cable). In some embodiments, user device 154 may be a key fob comprising a number of buttons (e.g., two, three, four, or more than four buttons) that respectively correspond to a function or command. Such key fob may include a battery to provide electrical power, an antenna for transmitting and receiving signals, and processing circuitry to convert user selections (e.g., presses of a button) to an electrical signal which may then be converted to a wireless signal (e.g., via the antenna). In some embodiments, user device 154 may comprise a proximity sensor associated with, e.g., an RFID tag, or other positioning sensor, which may enable processing circuitry to ascertain a location of a vehicle occupant associated with user device 154.

Server 156 may comprise a plurality of servers configured to remotely provide cloud computing resources (e.g., storage, processing, software applications, etc.) to other components of system 100, e.g., user device 154, vehicle 101, and any other suitable component. Server 156 may be configured to maintain one or more databases. In some embodiments, server 156 may be associated with a manufacturer or purchaser of vehicle 101, and may be configured to store (e.g., a cloud-based storage system or a database associated with server 156) information related to each vehicle sold by the manufacturer and related to an owner of each vehicle, e.g., login credentials associated with a user account and/or user profile of the vehicle owner with the manufacturer. In some embodiments, server 156 may comprise a collection of servers, and processing circuitry of server 156 can be distributed across a number of servers.

Figure 2:
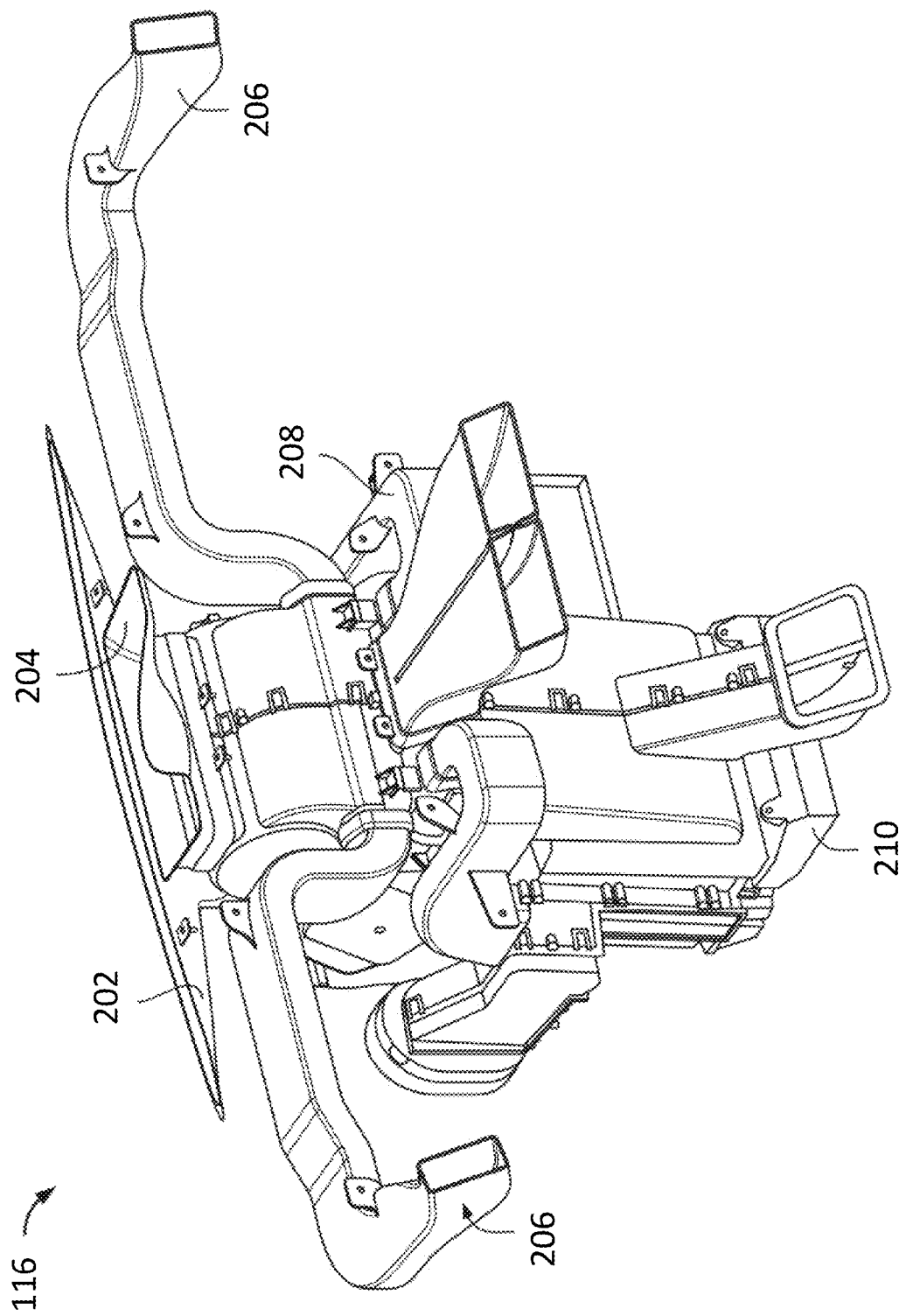
FIG. 2 shows an illustrative HVAC system of a vehicle, in accordance with some embodiments of the present disclosure.

FIG. 2 shows an illustrative HVAC system 116 of a vehicle, in accordance with some embodiments of the present disclosure. In some embodiments, HVAC system 116 may include assembly 210 for driving air to one or more ducts (e.g., by operation of a compressor, a pump, a fan, or a vacuum, or any other suitable component, or any combination thereof). In some embodiments, HVAC system 116 may comprise several different vent ducts 202-208 for respective air vents 120. In some embodiments, HVAC system 116 may include face ducts 206, foot ducts 208, ambient air duct 204, and windshield defrost duct 202. In some embodiments, processing circuitry 102 of vehicle 101, and/or air vent controller 118, may control airflow from each of the ducts 202-208 using a respective valve for each duct 202-208. For example, processing circuitry 102 of vehicle 101, and/or air vent controller 118, may cause a valve to be completely closed to stop all air flow, or partially open or close a valve to control the rate of the airflow. In some embodiments, processing circuitry 102 of vehicle 101, and/or air vent controller 118, may control airflow from each of the ducts using a respective blower motor or fan for each duct. It should be appreciated that FIG. 2 is illustrative and that additional ducts may be included at any suitable portion of vehicle 101, e.g., a duct connected to a seat and/or a duct connected to a storage compartment, etc.

Figure 3A:
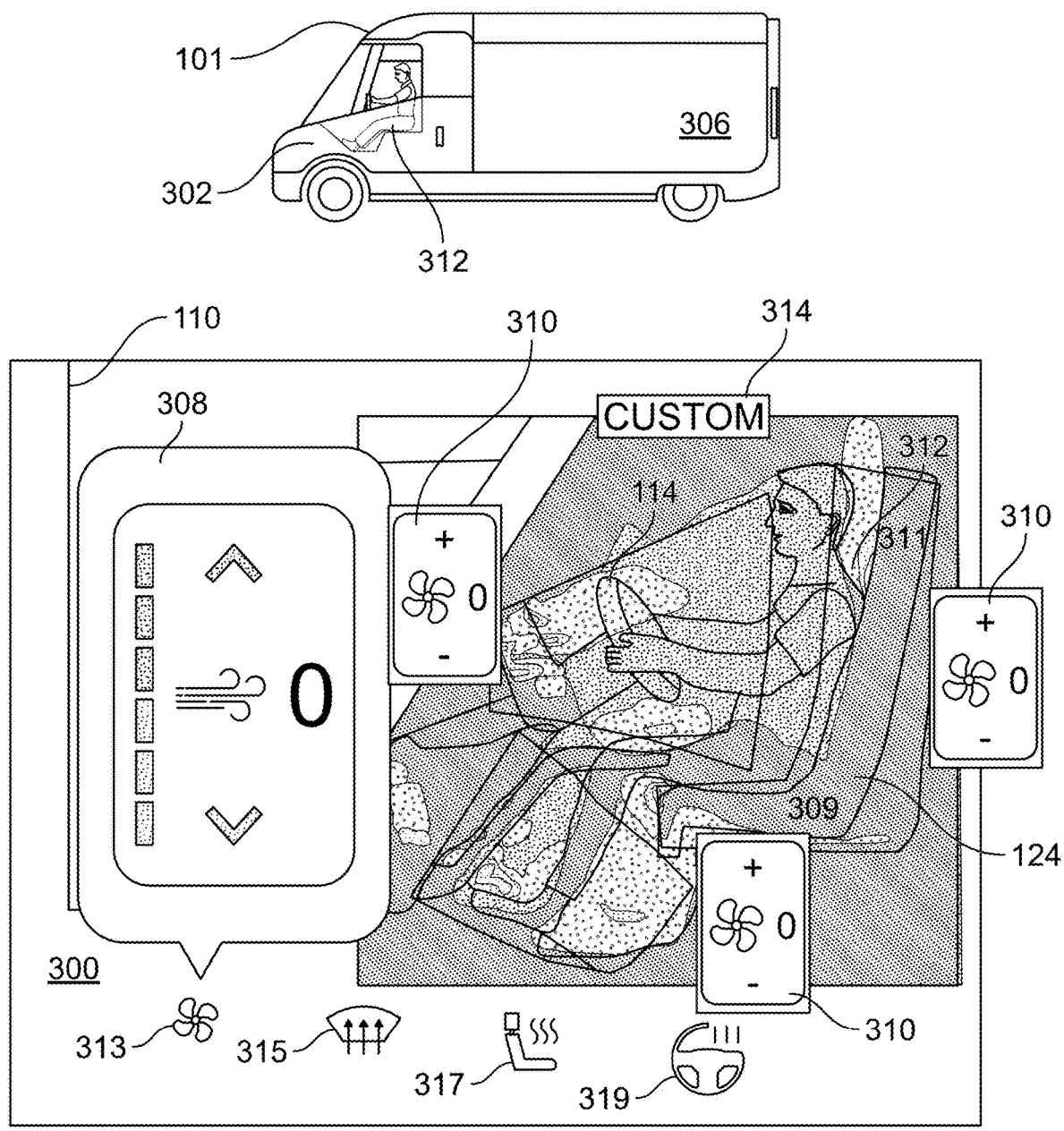
FIGS. 3A-3B show an illustrative scenario in which an HVAC system of a vehicle may be caused to thermally store energy in a vehicle seat, in accordance with some embodiments of the present disclosure.
Figure 3B:
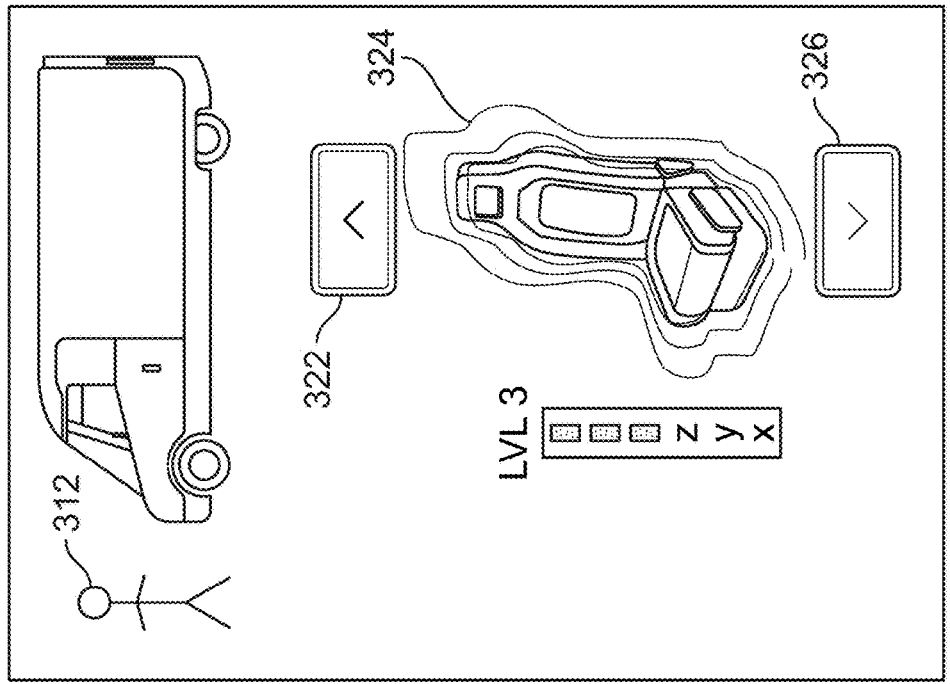

FIGS. 3A-3B show an illustrative scenario in which an HVAC system of a vehicle may be caused to thermally store energy in a vehicle seat, in accordance with some embodiments of the present disclosure. As shown in FIG. 3A, vehicle 101 may be a delivery vehicle comprising driver or operator zone or vehicle cabin 302 and cargo or loading zone 306, at which packages to be delivered may be stored. Vehicle cabin 302 may comprise ventilated seat 124 at which the vehicle occupant may sit and operate vehicle 101, input interface 114 (e.g., a steering wheel) and display 110, which may present information (e.g., current HVAC settings, such as, for example, settings associated with heating or cooling seat 124 or HVAC settings to be applied in the event the occupant is determined to exit seat 124 or seat 124 is otherwise unoccupied) to the operator, and configured to receive commands from the operator. In some embodiments, vehicle cabin 302 may comprise HVAC components to provide conditioned and/or ventilated air to vehicle occupants via one or more of various portions of vehicle cabin 302, or any other suitable components to heat or cool vehicle occupant 312, or any combination thereof. In some embodiments, vehicle cabin 302 may comprise a camera, e.g., image sensor 132, and any other suitable sensors (e.g., pressure sensor 134, seat belt sensor 136, door sensor 140), or any combination thereof, which may be configured to monitor actions of the user and a location of the user within vehicle 101 or outside vehicle 101. Cargo zone or loading zone 304 may correspond to a portion of vehicle 101 at which packages or products to be delivered are stored, e.g., a primary loading zone behind the cargo door or bulkhead door (e.g., controlled via a motor). In some embodiments, cargo zone 306 may comprise HVAC components to provide conditioned and/or ventilated air to vehicle occupants.

As shown in FIG. 3A, processing circuitry 102 may cause display 110 to provide interface 300 which may comprise any suitable number or type of options to control HVAC system 116, selectable when occupant 312 is in driver zone 302 as in the example of FIG. 3A, and/or remotely (e.g., via user device 154). Interface 300 may comprise selectable options 308 and 310, associated with icon 313, to set temperature setpoints of HVAC settings in vehicle 101. In some embodiments, respective options 310 may be provided for each portion of vehicle cabin 302, e.g., a portion that provides heating or cooling at a face of the user, a chest of the user, feet of the user, a back or rear of the user, or any other suitable portion of vehicle cabin 302, or any combination thereof. Icon 315 may correspond to a defrost operation, icon 317 may correspond to an option to activate heating or cooling of ventilated seat 124, and option 319 may correspond an option to activate heating or cooling of input interface 114 (e.g., steering wheel). Such options may permit a user to select heating and/or cooling settings, airflow settings, and mode of operation (face, foot, seat, or any other suitable portion, or any combination thereof).

In some embodiments, as shown in FIG. 3B, interface 300 may provide icons 316, 318 and 320 associated with heating seat 124, and icons 322, 324, 326 associated with cooling seat 124. Such icons may be selectable while occupant 312 is sitting in vehicle seat 124, to specify settings for heating or cooling seat 124. In some embodiments, any suitable combination of icons 316, 318 and 320 and icons 322, 324, 326 may be displayed, e.g., in response to receiving selection of icon 317 of FIG. 3A Icon 316 may indicate to occupant 312 a current setting associated with heating ventilated seat 124, e.g., that ventilated seat may be set to a particular temperature setpoint, or a particular level of heating (e.g., a level 3 heating level), or any other suitable setting. Icon 318 may be selectable to cause HVAC system 116 to increase an amount of, and/or temperature of, thermal energy provided to occupant 312, whereas option 316 may be selectable to cause HVAC system 116 to decrease an amount of heat, and/or decrease a temperature of thermal energy, provided to occupant 312.

In some embodiments, occupant 312 may toggle between, or be simultaneously presented with indications 316 and 322 of the heated seat mode and the cooling seat mode, respectively. The cooling mode may be associated with icons 322, 324, 326. Icon 324 may indicate to occupant 312 a current setting associated with cooling ventilated seat 124, e.g., that ventilated seat may be set to a particular temperature setpoint, or a particular level of cooling (e.g., a level 3 cooling level), or any other suitable setting. Icon 322 may be selectable to cause HVAC system 116 to increase an amount of thermal energy provided to occupant 312, and/or decrease a temperature of thermal energy provided to occupant 312, whereas option 326 may be selectable to cause HVAC system 116 to decrease an amount of thermal energy provided to occupant 312, and/or increase a temperature of thermal energy provided to occupant 312.

As shown in FIG. 3B, occupant 312 may move outside of seat 124 of vehicle 101 after previously sitting in vehicle seat 124, e.g., in order to deliver a package at a residential or commercial location, and seat 124 may be unoccupied. Processing circuitry 102 may perform a determination that occupant 312 has left vehicle seat 124 or that seat 124 is otherwise unoccupied. This determination may be based on signals received from one or more sensors, e.g., image sensor 132, pressure sensor 134, seat belt sensor 136, door sensor 140, short-range communication signals from user device 154, GPS signals from user device 154, or any other suitable sensor, or any combination thereof. Based on determining that occupant 312 has left vehicle seat 124 or is otherwise unoccupied, processing circuitry 102 may cause ventilated seat 124 to store thermal energy. For example, such storage of thermal energy may be transmitted to the seat mass, to enable the seat 124 to transmit the stored energy to the body of occupant 312, e.g., via conduction, upon his or her return to vehicle seat 124.

Processing circuitry 102 may instruct ventilated seat 124 to store a particular type of thermal energy based on any suitable number of factors. For example, if a temperature reading received from ambient temperature sensor 137 indicates that the outside environment, e.g., that occupant 312 entered in order to deliver a package, is very cold, processing circuitry 102 may determine that an amount of heat being provided by ventilated seat 124 should be superconditioned, e.g., superheated, e.g., boosted to prove more hot thermal energy and/or hotter thermal energy to ensure thermal comfort of occupant 312 upon his or her return. For example, while occupant 312 is outside vehicle 101, processing circuitry 102 may cause the heating level indicated at 316 to be increased form a third level of intensity to a fourth level of intensity.

In contrast, if a temperature reading received from ambient temperature sensor 137 indicates that the outside weather environment, e.g., that occupant 312 entered in order to deliver a package, is very hot, processing circuitry 102 may determine that a level of cooling being provided by ventilated seat 124 should be superconditioned, e.g., supercooled or superchilled, e.g., boosted to provide more cool thermal energy and/or colder thermal energy to ensure thermal comfort of occupant 312 upon his or her return. In some embodiments, feedback from seat temperature sensor 131 may be utilized by processing circuitry 102 to determine whether, and how much and/or what type, or thermal energy should be stored by vehicle seat 124 when occupant 312 leaves seat 124. For example, while occupant 312 is outside vehicle 101, processing circuitry 102 may cause the cooling level indicated at 324 to be increased form a third level of intensity to a fourth level of intensity.

In some embodiments, at least a portion of air being provided via air vent 120 can be re-directed or caused to be transferred towards a component (e.g., vehicle seat, steering wheel or any other suitable thermal storage device, or any combination thereof) for storage therein, instead of being blown into an environment where the occupant is not present, and potentially out of an open door or window. Such aspects enable thermal energy (heat or cooling) to be stored in areas of driver zone 302 (e.g., above and beyond the thermal energy being provided when occupant 312 left vehicle 101) that are largely shielded from heavy energy exchange with the ambient. Such thermal energy may be directly transmitted over a large surface area of the seat (e.g., via conduction) to the occupant's body as the occupant sits down, which may rejuvenate driver who may be returning from a potentially very hot or very cold outside environment, in an energy efficient and thermally effective manner. For example, in cold weather, if the occupant is wearing heavy clothing insulation, transfer of heat energy through the clothing and into the occupant's body may be accelerated, and in hot weather, an initial sensation upon sit-down may be a slight "thermal shock" which may feel comforting to occupant 312. In some embodiments, the re-directing may comprise causing conditioned air to flow into seat 124, while permitting unconditioned air to circulate in vehicle cabin 302.

In some embodiments, heating or cooling of input interface 114 (e.g., a steering wheel) may be increased (e.g., depending on ambient temperature) while occupant 312 is outside of the vehicle, to provide thermal comfort to the hands of occupant 312 when he or she returns to vehicle 101. In some embodiments, historical data of previous selections by the user, or by other users, may be used to adjust the one or more parameters of HVAC system 116 and/or provide recommendations to the user. In some embodiments, display 110 may enable occupant 312 to specify different preferences for when parameters of HVAC system 116 should be adjusted, e.g., when occupant 312 is determined to leave vehicle 101. In some embodiments, HVAC system 116 may comprise a portion (e.g., a thermal chamber) configured to store thermal energy while occupant 312 is outside of vehicle 101, which may be directed towards occupant 312 upon his or her return to vehicle 101.

Figure 4:
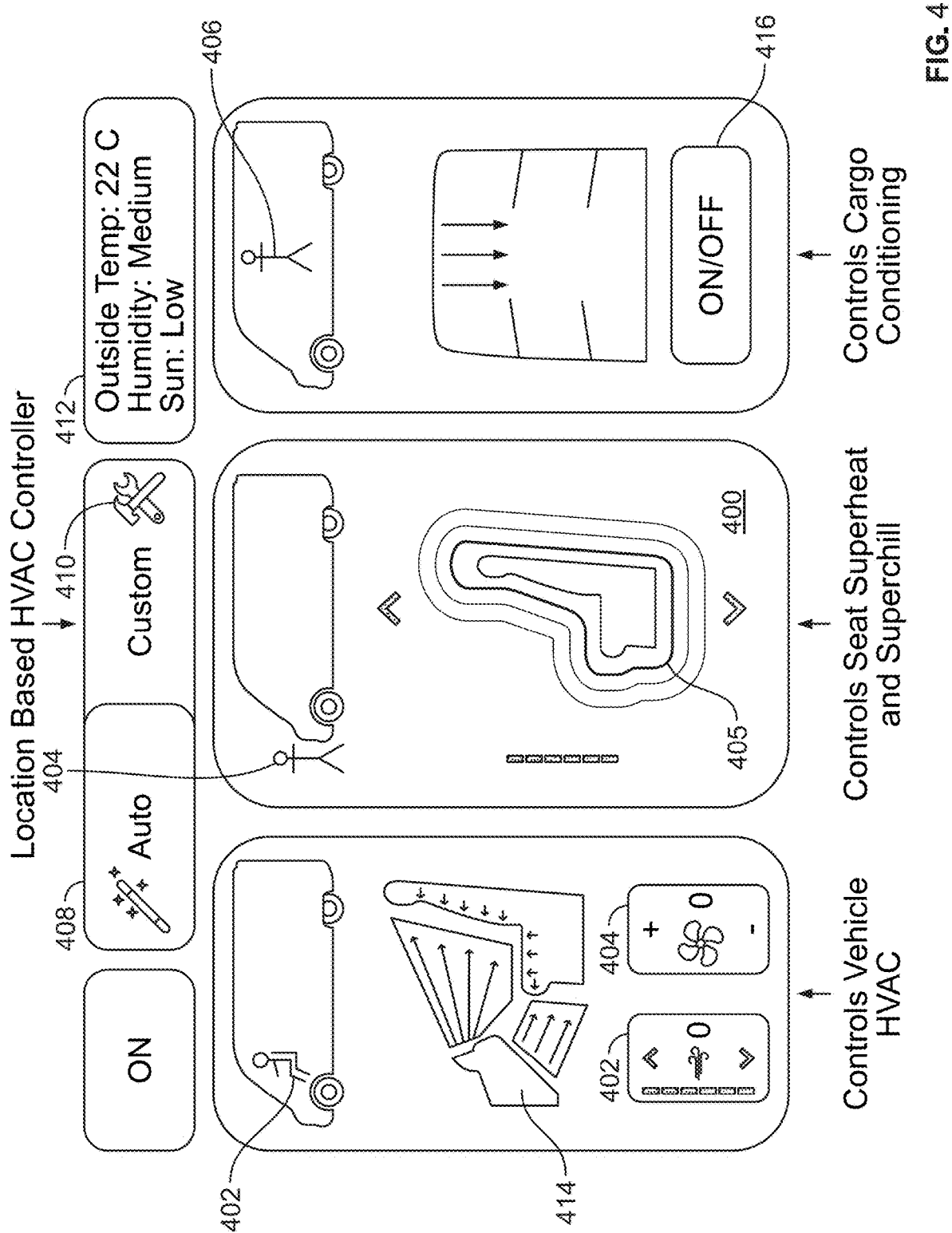
FIG. 4 shows portions of an illustrative HVAC climate control interface, in accordance with some embodiments of the present disclosure.

FIG. 4 shows portions of an illustrative HVAC climate control interface, in accordance with some embodiments of the present disclosure. HVAC climate control interface 400 may be provided via display 110 or user device 154 or any other suitable device, or any combination thereof. HVAC climate control interface 400 may indicate the operators position within the vehicle, based on instructions received from processing circuitry 102 (e.g., via I/O circuitry 108). For example, interface 400 may comprise an indication 402 that occupant 312 is in vehicle cabin 302 and/or seat 124, an indication 404 that occupant 312 has left vehicle cabin 302 to an environment outside vehicle 101, and an indication 406 that occupant 312 is located in cargo zone 306 of vehicle 101. Interface 400 may provide HVAC settings associated with each respective operator position 402, 404, 406. For example, interface 400 enables occupant 312 to choose an HVAC setpoint for each of their physical locations 402, 404, 406 relative to vehicle 101, to instruct HVAC system 116 to adapt to the circumstances (e.g., a dynamic delivery scenario, or any other suitable scenario), to provide maximum energy efficiency and thermal comfort.

Interface 400 may comprise icon 408, selectable to cause HVAC system 116 to enter an automated HVAC mode. For example, processing circuitry 102, in response to determining that icon 408 has been selected, may set HVAC system 116 (e.g., ventilated seat 124) to recommended temperature setpoints (e.g., presets) and/or HVAC settings (e.g., a level of cooling or level of heat) for the given conditions (e.g., ambient temperatures, whether the door is left open, or any other suitable condition, or any combination thereof). In some embodiments, such recommended temperature setpoints or HVAC settings may be determined based on simulation and/or test results, designed to maintain positive thermal comfort (e.g., during deliveries, when occupant 312 returns to seat 124). Such HVAC settings may be tuned or modified by the occupant at any time by driver, e.g., by selecting icon 410. Thus, many drivers or other occupants may achieve thermal comfort with a single button push associated with icon 408, and may conveniently manually modify such settings to his or her preference. The settings associated with icon 408 may dynamically change throughout the day, e.g., based on ambient weather conditions.

In some embodiments, a user may specify heating or cooling settings (e.g., superheating or supercooling, or any other suitable setting, or any combination thereof) with respect to vehicle seat 124 by way of icon 404, e.g., tapping an arrow to increase or decrease heating or cooling levels. Such settings may be implemented in response to processing circuitry 102 determining that occupant 312 has left vehicle seat 124. In some embodiments, seat 124 may comprise one or more temperature sensors, e.g., a back temperature sensor, a sensor positioned in a cushion the user sits on, and a state of seat 124 may be determined based on readings any of the one or more sensors, or any combination thereof. In some embodiments, a temperature for seat 124 may be determined at least in part based on a temperature of a surface of seat 124.

In some embodiments, if a driver selects a higher or lower seat superheat or superchill than predicted, processing circuitry 102 may accept the new settings, but may de-rate one or more HVAC components when the driver is in the outside environment, depending on conditions (e.g., if a door is left open, the user setting may be discarded). In some embodiments, if a driver selects a less energy consuming setpoint than predicted or a higher or lower seat superheat or superchill than predicted, processing circuitry 102 may accept the new settings, and implement such settings since it may conserve more energy than the recommended settings. In some embodiments, certain features (e.g., out of cabin conditioning or cargo conditioning) may be disabled, e.g., based on the ambient temperature detected, or any other suitable condition. Interface 400 may comprise indication 412 of ambient conditions, e.g., temperature, humidity, solar irradiance, or any other suitable condition, or any combination thereof. Interface 400 may comprise icon 414 at which the user may specify various HVAC settings with respect to different air vents or portions of vehicle cabin 302 (e.g., request to concentrate air on a face of the user).

In some embodiments, the environment in cargo portion 306 may fluctuate significantly based on the ambient weather, e.g., may become very hot in very hot ambient conditions and/or very cold in very cold ambient conditions. In such a circumstance, it may be desirable to, in response to processing circuitry 102 detecting that occupant 312 has left vehicle seat 124 and entered cargo portion 306, provide a boost of thermal energy to seat 124. This may enable occupant 312, upon returning to seat 124, to be quickly rejuvenated via heat transfer over a large surface area between occupant's body and seat 124, after leaving a potentially uncomfortable environment of cargo zone 306.

Figure 5:
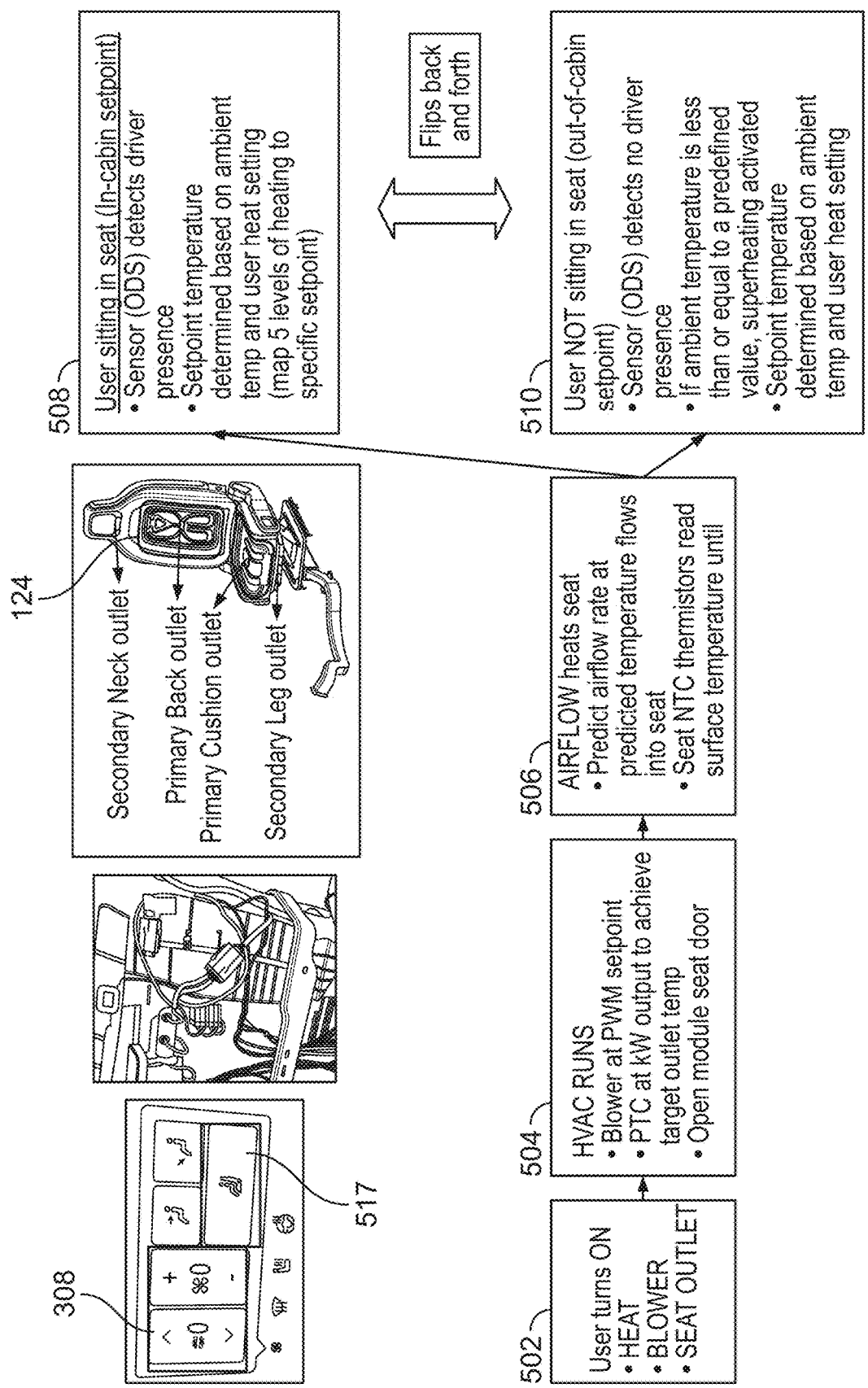
FIG. 5 shows a flowchart of, and portions of a system for, an illustrative process for causing an HVAC system of a vehicle to thermally store energy in a vehicle seat, in accordance with some embodiments of the present disclosure.

FIG. 5 shows a flowchart of, and portions of a system for, an illustrative process for causing an HVAC system of a vehicle to thermally store energy in a vehicle seat, in accordance with some embodiments of the present disclosure. At 502, processing circuitry 102 may receive a request from occupant 312 to turn on HVAC system 116. For example, the request may instruct processing circuitry 102 to perform heating or cooling of ventilated seat 124, using any suitable components, e.g., a blower, a fan, heating element 128, cooling element 126, or any other suitable component or any combination thereof). In some embodiments, icon 517 may be selectable to activate a seat cooling or heating mode. In some embodiments, processing circuitry 102 may receive a request from occupant 312 to turn on HVAC system 116 using custom settings, and/or a request to automatically set certain settings of HVAC system 116.

At 504, HVAC system 116 may begin operating based on the input received at 502. In some embodiments, HVAC system 116 may provide thermal energy within vehicle cabin 302 based on a target temperature, e.g., for seat 124, the vehicle cabin overall, or any other suitable portion of vehicle 101, or any combination thereof. For example, a blower or heater may be set to a certain output power level, to provide thermal energy to one or more portions of vehicle 101 based on respective target temperatures, e.g., determined based on user input and/or ambient temperatures and/or current temperatures of seat 124 or any other suitable portion of vehicle cabin 302.

At 506, processing circuitry 102 may determine a suitable amount or temperature of thermal energy to be provided via HVAC system 116, e.g., ventilated seat 124. For example, a suitable amount of thermal energy may be directed to seat 124, while taking into account a current temperature of seat 124 via seat temperature sensor 133, to reach a target temperature and/or cooling or heating level.

At 508 and 510, processing circuitry 102 may determine whether occupant 312 is present in vehicle seat 124, e.g., to perform a delivery. In some embodiments, vehicle occupant 312 may leave seat 124 while vehicle 101 is in operation, e.g., in park and with HVAC system 116 of vehicle 101 having been left on, while he or she delivers the package. Processing circuitry 102 of vehicle 101 may determine that vehicle occupant 312 has left seat 124, and/or that HVAC system 116 remains in operation, and/or that a vehicle door has been left open, based on signals received from one or more sensors described in connection with FIG. 1. As shown in FIG. 5, seat 124 may comprise any suitable number of components to provide thermal energy to occupant 312, e.g., a neck outlet, a back outlet, a bottom cushion outlet, a leg outlet, or any other suitable outlet at any suitable location, or any combination thereof. In some embodiments, processing circuitry 102 of vehicle 101 may communicate with GPS 148, or user device 154 or server 156, or any other suitable device, or any combination thereof, to determine that vehicle occupant 312 has stopped to perform a delivery.

At 508, if the user is determined to be present in seat 124, the HVAC settings may be maintained, e.g., based on ambient temperature and/or user input settings. In some embodiments, processing circuitry 102 of vehicle 101 may determine an ambient temperature in an environment surrounding vehicle 101, based on an output received from ambient temperature sensor 137 or otherwise received via network 155 or via another device, e.g., user device 154 or server 156, or any other suitable device or combination of devices. For example, processing circuitry 102 or HVAC system 116 may determine a suitable target temperature or setting for vehicle cabin 302 (or a portion thereof, such as a portion corresponding to where the vehicle occupant's feet are positioned while operating vehicle 101, or any other suitable portion, or any combination thereof) and/or a suitable target temperature or setting for ventilated seat 124, based on the ambient temperature and current characteristics of HVAC system 116. Processing circuitry 102 may adjust HVAC system 116 by causing HVAC system 116 to conform to the determined target temperature(s) or setting(s), e.g., adjusting an open or closed state of one or more air vents 120 and/or a cooling or heating state of ventilated seat 124. In some embodiments, HVAC system 116 may switch between providing thermal energy to ventilated seat 124 versus a portion of vehicle cabin 302 at which occupant 312 keeps his or her feet and/or a portion of vehicle cabin 302 at which occupant 312 keeps his or her face, his or her chest, or any other suitable portion of vehicle cabin 302. Such options may provide any suitable number of levels, e.g., fan levels or air vent levels.

At 510, if the user is determined not to be present in seat 124 or seat 124 is otherwise determined to be unoccupied, superheating or supercooling may be activated to a component (e.g., vehicle seat 124, input interface 114 such as a steering wheel, or any other suitable component, or any combination thereof) based on whether an ambient temperature is less than or equal to (or greater than or equal to) a predefined value or within a predefined range. For example, if processing circuitry 102 determines the ambient temperature corresponds to a very hot temperature, HVAC system 116 may be maintained or only slightly reduced from a relatively high ventilated seat cooling level within vehicle 101. On the other hand, if processing circuitry 102 determines the ambient temperature corresponds to a moderate temperature, processing circuitry 102 may determine that thermal comfort of vehicle 101 can be maintained even if HVAC system 116 is turned off, or HVAC system 116 may be modified to reduce the output power of, or de-rate, HVAC system 116 with respect to vehicle cabin 302 while still maintaining thermal comfort for the vehicle occupant, thereby conserving energy. In some embodiments, one or more components of HVAC system 116 may be modified based on particular slew rates for different ambient temperatures.

In some embodiments, during normal operation (e.g., at 508), processing circuitry 102 may utilize a bounded range (e.g., a maximum cooling value and/or a maximum heating value), where target temperatures outside of such range may not be utilized unless the user is determined to be outside vehicle 101. On other hand, at 501, processing circuitry may heat or cool seat 124 to a temperature or level that is outside the bounded range, and then return the thermal energy being provided to normal operating conditions once occupant 312 is detected to have returned, or after a predefined period after occupant 312 is detected to have returned. In some embodiments, the target temperature or target thermal energy condition for seat 124 when occupant 312 has left seat 124 may be determined based on user input or automatically.

In some embodiments, a signal output by pressure sensor 134 may indicate that vehicle occupant 312 has left seat 124, and door sensor 140 may indicate that a door has been left open. In such circumstances, it may be desirable, to ensure maximum energy efficiency, that thermal conditioning of vehicle 101 is dynamic, e.g., to "follow" the position or location of the operator in the sense that the operational mode, output, and/or output location associated with HVAC system 116 should change relative to where the user is located. For example, if processing circuitry 102 determines that operator is outside on a delivery, and a vehicle door was left open, it may be inefficient to keep HVAC system 116 in a cabin air conditioning mode since the conditioned air may simply be blown out of the open door to exchange energy with the environment, and it may be desirable for HVAC system 116 to be adjusted based at least in part on taking these circumstances into account (e.g., to instead direct a boost of thermal energy to seat 124).

In some embodiments, one or more of heating, cooling and/or airflow (e.g., to seat 124) may be boosted upon determining occupant 312 has returned to vehicle cabin 302, to help occupant 312 return to thermo-equilibrium quickly. In some embodiments, instead of bulk conditioning the entire cabin to a uniform temperature (hot or cold), processing circuitry 102 may cause heat flux to be locally directed to occupant 312. In some embodiments, slewing or lowering of the conditioning or ventilation, or any other HVAC operation, may be performed based on a control signal received from processing circuitry 102, while occupant out of vehicle cabin 302, to reduce overall energy usage.

In some embodiments, processing circuitry 102 and/or HVAC system 116 may reference a table stored in memory 106 (or memory of server 156, or any other suitable memory or any combination thereof) in determining the manner in which to cause seat 124 (and/or any other suitable component) to store thermal energy therein. For example, Table 1 shown below may be referenced by processing circuitry 102. As shown in Table 1, any suitable number of factors may be taken into account, e.g., solar irradiance on vehicle 101, ambient temperature, blower power (e.g., how much conditioned or unconditioned air to blow), heater temperature, evaporation setpoint (e.g., how much heating or cooling should be provided), target temperature (e.g., for superchilling or superheating ventilated seat 124), and an indication of whether HVAC should stay on, and any other suitable factor, or any combination thereof. For example, processing circuitry 102 may access Table 1 shown below and perform a lookup using the determined values for one or more of such factors with respect to a current scenario in which vehicle occupant 312 exited vehicle 101, in order to identify one or more actions to be taken (or whether such actions should be taken) with respect to HVAC system 116.

In some embodiments, Table 1 may be utilized when processing circuitry 102 determines vehicle 101 is in a repeated deliveries mode (e.g., by referencing a delivery schedule, provided via server 156 or user device 154 or any other suitable source, or any combination thereof). In some embodiments, HVAC system 116 adjustments may be fully calibrated across the ambient temperature range to adapt to a dynamic environment. In some embodiments, processing circuitry 102 may be configured to keep a particular HVAC element on (e.g., to keep a blower spinning, or any other suitable component, or any combination thereof) to avoid start-up delay when occupant 312 returns to vehicle 101, e.g., if HVAC is on, the blower may be kept on. In some embodiments, a temperature of a breath of occupant 312 (e.g., measured by a thermocouple) may be taken into consideration when performing the adjusting of an HVAC parameter, and may be correlated with a vehicle cabin temperature. In some embodiments, measurements of ventilated seat 124, a foot region of vehicle cabin 302, and an air vent region of cabin 302 may be taken into consideration when determining a manner in which thermal energy should be stored in seat 124, and/or a temperature at any other suitable portion of vehicle 101 may be taken into consideration, or any combination thereof.

In some embodiments, processing circuitry 102 and/or HVAC system 116 may take into account whether a vehicle door (or any other suitable door or window or other component, or any combination thereof) has been left open when vehicle occupant 312 exits vehicle cabin 302. For example, a vehicle door may be relatively heavy, and thus many drivers or operators of vehicle 101 may leave a vehicle door open when performing a relatively quick delivery of a package (e.g., it may strain the driver or operator's arms to constantly close the door after a large number of deliveries). In such a circumstance, processing circuitry 102 may pull energy into ventilated seat 124, as opposed to blowing or directing air into vehicle cabin 302 which may simply exit via the open door, and such technique may enable a large surface area of a body of occupant 312 to come in contact with hot or cold thermal energy (e.g., set based on the ambient temperature) upon sitting down again, thereby providing an efficient thermal energy transfer mechanism.

In some embodiments, certain portions of HVAC system, e.g., air vent 120 providing conditioned air, or any other suitable portion, may be turned off upon determining a vehicle door has been left open during a delivery. In some

TABLE 1

| Out-of-Cabin Deliveries | Ambient Temp | Blower Power | Heater Temp | Evaporation Setpoint | Target Temperature for Seat | HVAC stay on? |
|---|---|---|---|---|---|---|
| Low solar irradiance | Very Low | High | High | N/A | Very High | Yes, keep full heating on |
| Low solar irradiance | Low | High | High | N/A | High | Yes, keep full heating on |
| Moderate solar irradiance | Moderate | Low | Moderate | N/A | N/A | Conserve power, slew heater and blower to zero |
| High solar irradiance | Moderate | Moderate | N/A | High | Moderate | Keep cooling on. Slew to min. over time |
| High solar irradiance | High | High | N/A | Moderate | Very Low | Yes, keep full cooling on |
| Low solar irradiance | Very High | High | N/A | Low | Low | Yes, keep full cooling on | embodiments, in addition to taking into account whether a vehicle door has been left open, processing circuitry 102 may take into account an ambient temperature or other ambient conditions. For example, if the ambient temperature is moderate, the door being left open may have a negligible impact on the operator's thermal comfort upon returning to vehicle 101 (e.g., occupant 312 may be comfortable naturally with based on his or her metabolic rate and clothing), and thus no or minimal adjustment to HVAC system 116 may be performed. On the other hand, if the ambient temperature is very hot or very cold, processing circuitry 102 may determine that it would be inefficient to leave HVAC system 116 operating in its current state, and instead direct a boost of thermal energy to seat 124.

In some embodiments, in determining a manner in which to provide thermal energy to seat 124, processing circuitry 102 and/or HVAC system 116 may reference a table that is specific to an open door state or closed door state. In some embodiments, HVAC system 116 may determine which types of clothing a driver is wearing (e.g., a heavy coat or a t-shirt, or any other suitable clothing), such as based on input received from the driver or based on processing images of the driver captured by a camera, and may take into account such clothing when determining a manner in which to store thermal energy in a vehicle component. For example, an amount of thermal energy directed to ventilated seat 124 may be less when the driver is wearing heavy clothing as opposed to if the driver is lightly dressed.

In some embodiments, HVAC system 116 may compensate for different conditions while driving, in an effort to maximize thermal comfort and minimize energy usage. For example, many delivery drivers may leave a door, or another door or window or other suitable component, or any combination thereof, open while driving to a next delivery location. In such a circumstance, processing circuitry 102 may cause HVAC system 116 to, e.g., ramp down a blower if the vehicle exceeds a certain speed, or determine that less cooling should be provided due to an open door. In some embodiments, processing circuitry 102 may reference a first table (specific to when a driver is in a cabin with the door closed) or a second table (specific to when a driver is in the cabin with the door open), based on indications received from one or more sensors of the driver's location and whether one or more doors are open or closed. Such tables may be in a similar format to Table 1, and may correspond to a repeated deliveries mode.

In some embodiments, the HVAC system 116 may be adjusted based on an in-cabin long drive mode, e.g., when the delivery driver is determined to be driving on a relatively long continuous drive (e.g., on a highway), such as, for example, after a delivery shift has ended. Such in-cabin long drive mode may reference a table specific to such a mode, to maximize thermal comfort of vehicle occupant 312 while optimizing efficiency of HVAC system 116. In some embodiments, processing circuitry 102 may be configured to switch between the various modes, e.g., out of cabin deliveries, in cabin deliveries (door closed), in cabin deliveries (door open), long drive mode, or any other suitable modes, or any combination thereof, based on the location of vehicle occupant 312 frequently changing throughout a driving session (e.g., delivery shift, or other suitable driving session).

Figure 6:
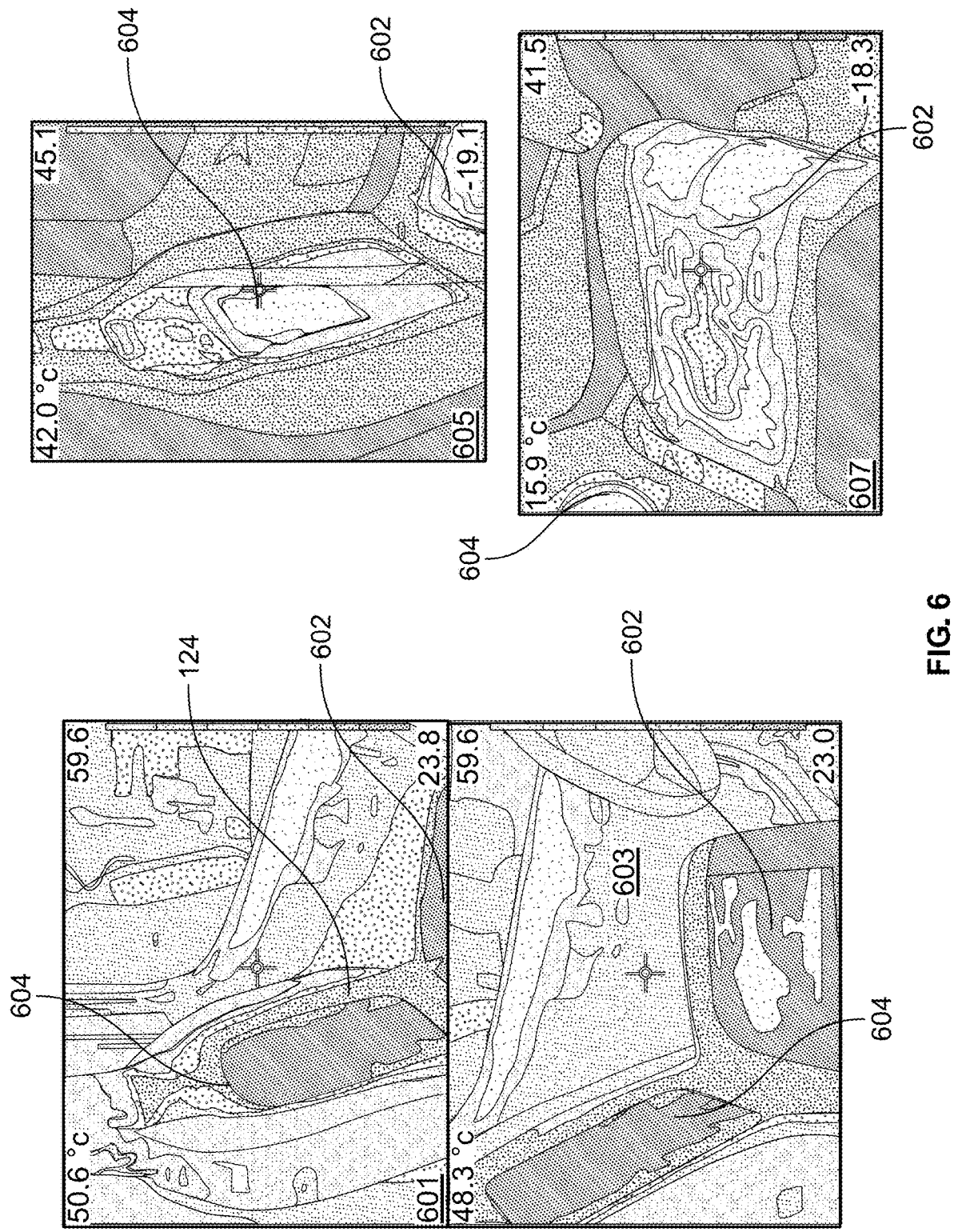
FIG. 6 show shows illustrative thermal images of a vehicle seat as a thermal energy storage device, in accordance with some embodiments of the present disclosure.

FIG. 6 show illustrative thermal images of a vehicle seat as a thermal energy storage device, in accordance with some embodiments of the present disclosure. As shown in images 601 and 603, seat 124 may effectively store thermal energy (e.g., cooling) in seat cushion 602 and 604 even if the rest of the environment of vehicle cabin 302 is largely impacted by a different type of thermal energy (e.g., heat). As shown in images 605 and 607 on the left-hand side of FIG. 6, seat 124 may effectively store thermal energy (e.g., heat) in seat cushion 602 and 604 even if the rest of the environment of vehicle cabin 302 is largely impacted by a different type of thermal energy (e.g., cooling). In some embodiments, HVAC system 116 may be able to quickly pull down or pull up the temperature of seat 124 (e.g., by 30 degrees Celsius in 4 minutes or less). In some embodiments, seat 124 may comprise a dedicated outlet at any suitable location (e.g., at the back of the neck of the user and/or the back of the legs, or any other suitable location).

Figure 7:
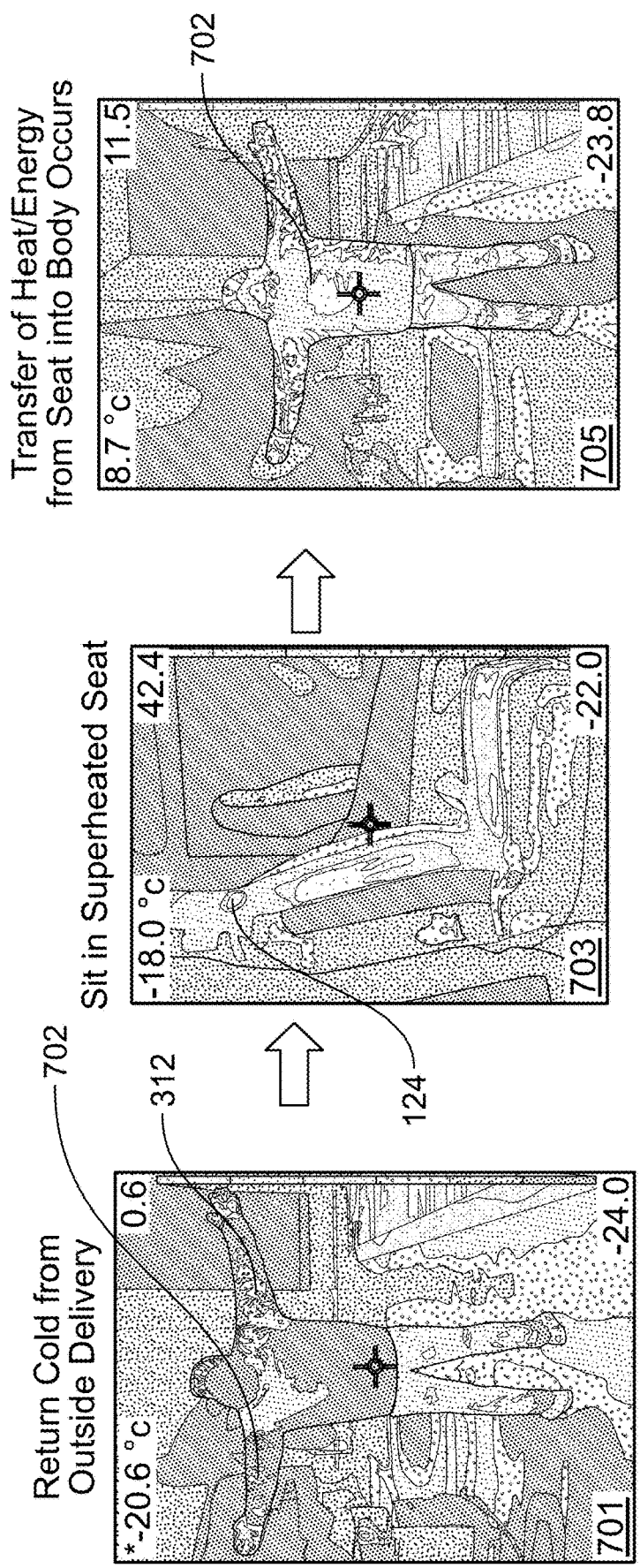
FIG. 7 show illustrative thermal images, in accordance with some embodiments of the present disclosure.

FIG. 7 show illustrative thermal images, in accordance with some embodiments of the present disclosure. As shown in image 701, vehicle occupant 312 may be returning from the environment outside vehicle 101 which may be a cold weather environment, e.g., after performing a delivery, and clothing 702 of occupant 312 may have stored cold thermal energy. Occupant 312 may then return to vehicle 101 and sit in ventilated seat 124, having been superheated to provide thermal comfort to occupant 312 after processing circuitry 102 detected the exit of occupant 312 from seat 124 shown in image 703. As shown in image 705, after sitting in superheated seat 124, a transfer or heat energy from seat 124 to the body and clothing 702 of occupant 312 occurs, which efficiently provides thermal comfort to occupant 312. For example, thermal energy may be stored in seat 124 while occupant 312 is out for delivery, and upon his or her return to seat 124, energy may be quickly transferred back into occupants' core due to large area of conduction.

Figure 8:
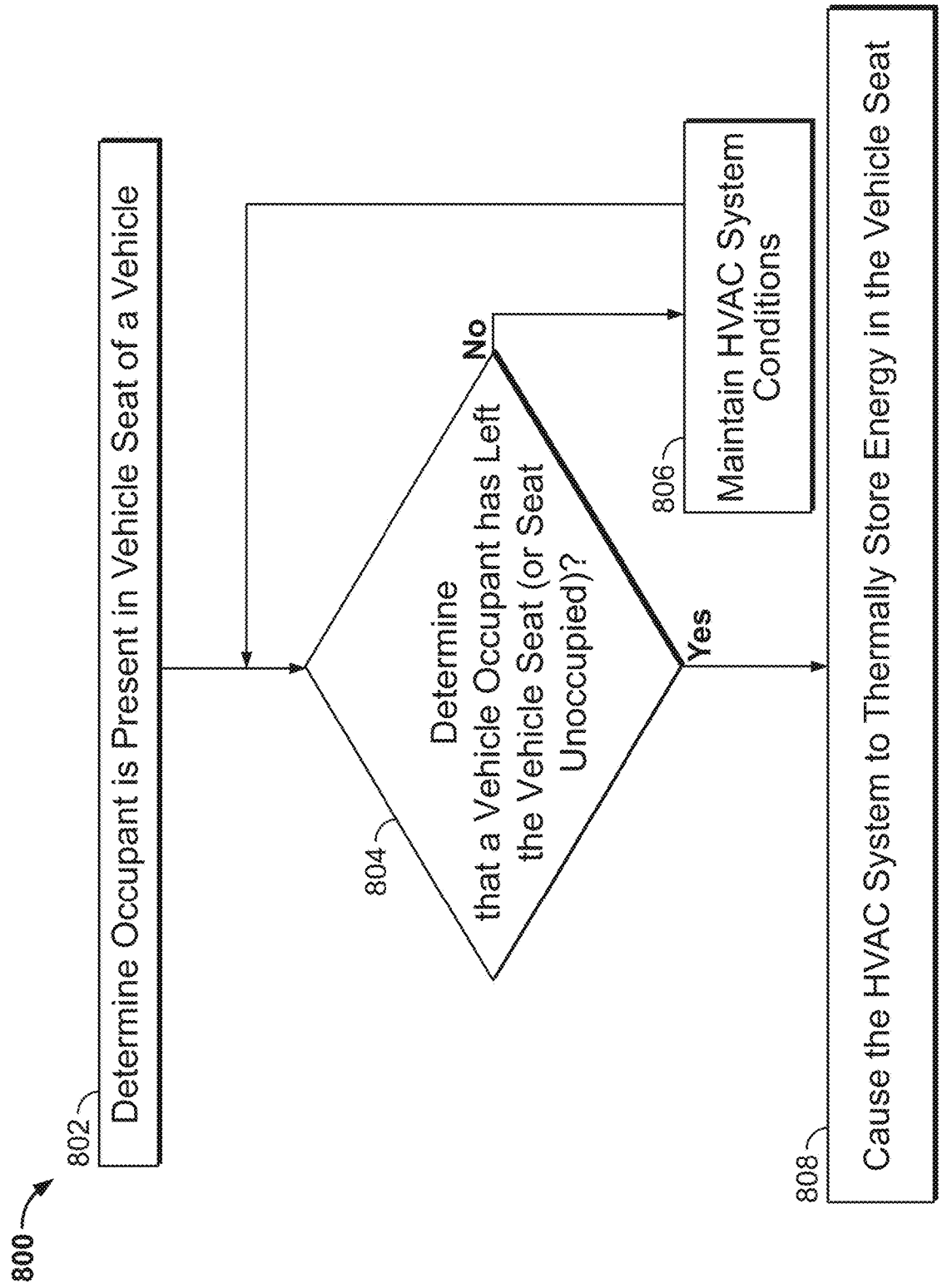
FIG. 8 shows a flowchart of an illustrative process for causing an HVAC system of a vehicle to thermally store energy in a vehicle seat, in accordance with some embodiments of the present disclosure.

FIG. 8 shows a flowchart of an illustrative process for causing an HVAC system of a vehicle to thermally store energy in a vehicle seat, in accordance with some embodiments of the present disclosure. Process 800 may be executed at least in part by processing circuitry 102 of vehicle 101, and/or circuitry of HVAC system 116, or any other suitable circuitry, or any combination thereof.

At 802, processing circuitry 102 of vehicle 101 may determine that vehicle occupant 312 is present in vehicle cabin 302 of vehicle 101. Processing circuitry 102 may make this determination based on signals received from one or more sensors. For example, processing circuitry 102 may receive a signal from pressure sensor 134 indicating that vehicle occupant 312 is sitting in ventilated seat 124, or processing circuitry 102 may receive any other suitable sensor signals indicating the presence of occupant 312 in ventilated seat 124.

At 804, processing circuitry 102 of vehicle 101 may determine whether vehicle occupant 312 has left seat 124 of vehicle 101. Processing circuitry 102 may make this determination based on signals received from one or more sensors. For example, processing circuitry 102 may receive a signal from pressure sensor 134 indicating that vehicle occupant 312 is no longer sitting in ventilated seat 124, or processing circuitry 102 may receive any other suitable sensor signals indicating the presence of occupant 312 in seat 124. In some embodiments, determine whether vehicle occupant 312 has left seat 124 of vehicle 101 may comprise identifying that user device 154 (e.g., a user smartphone or keyfob) has left vehicle 101, a cabin camera failing to detect the presence of occupant 312 in cabin 302, a combination of vehicle 101 being left on and a car door opening, a current vehicle location corresponding to a delivery location and detecting a car door has opened, or based on any other suitable sensor signal or other indication or occurrence, or any suitable combination thereof. In some embodiments, at

804, processing circuitry 102 of vehicle 101 may determine whether seat 124 of vehicle 101 is unoccupied. For example, vehicle 101 may be partially of fully autonomous, and step 802 may optionally be omitted. As another example, if at least one occupant remains in seat 124 of vehicle 101 when occupant 312 exits vehicle 101, it may be desirable to maintain the current HVAC settings.

Figure 3B:
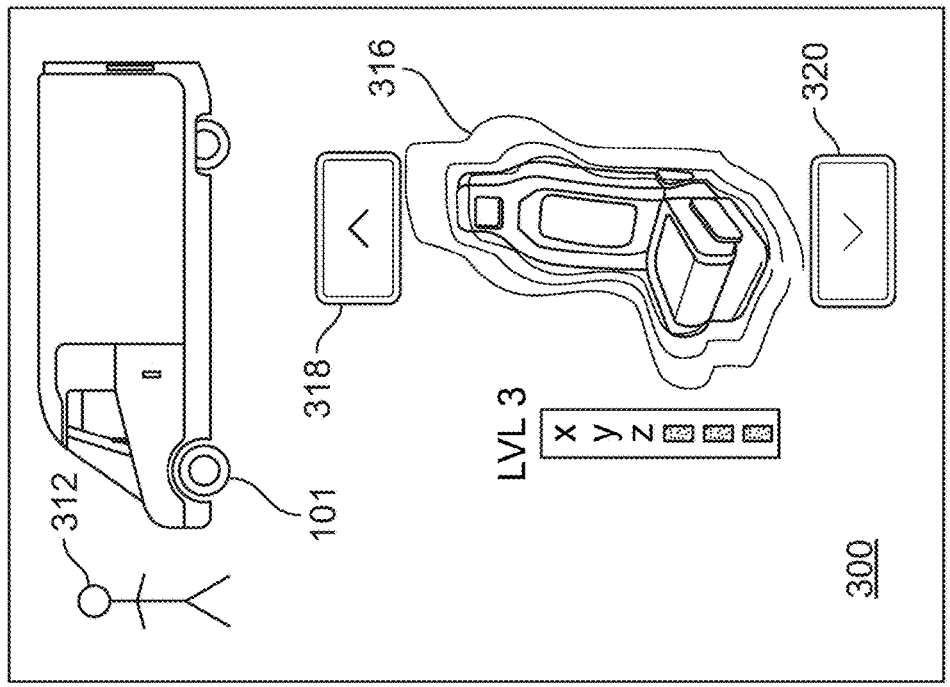

In some embodiments, processing circuitry 102 may additionally determine whether HVAC system 116 of vehicle 101 is in operation or was in operation when occupant 312 left seat 124. For example, prior to leaving seat 124, one or more selections of HVAC settings may have been received from vehicle occupant 312 via interface 300 of FIG. 3, interface 400 of FIG. 4, or any suitable interface, or any combination thereof.

If processing circuitry 102 determines that occupant 312 still remains in vehicle cabin 302, processing may proceed to 806, where current HVAC system parameters may be maintained, e.g., off or on, such as, for example, in a custom state selected by the user, or in an automated state selected by the user via icon 408. If processing circuitry 102 determines that occupant 312 does not remain in vehicle cabin 302, processing may proceed 808.

At 808, processing circuitry 102 may cause HVAC system 116 to thermally store energy in vehicle seat 124. For example, this may occur while occupant 312 remains outside of vehicle 101, e.g., delivering a package to a customer. For example, processing circuitry 102 may boost heating or cooling energy being applied to seat 124, based on a temperature of one or more of the ambient environment and the vehicle cabin 302, based on whether a vehicle door was left open or based on any other suitable factor, or any combination thereof. In some embodiments, HVAC system 116 may facilitate the thermal storage of energy in vehicle seat 124 directing thermal energy to ventilated seat 124 of vehicle 101 (e.g., instead of blowing at least a portion of such energy via air vent 120), which may store thermal energy and provide thermal comfort to occupant 312 upon his or her return.

Figure 9:
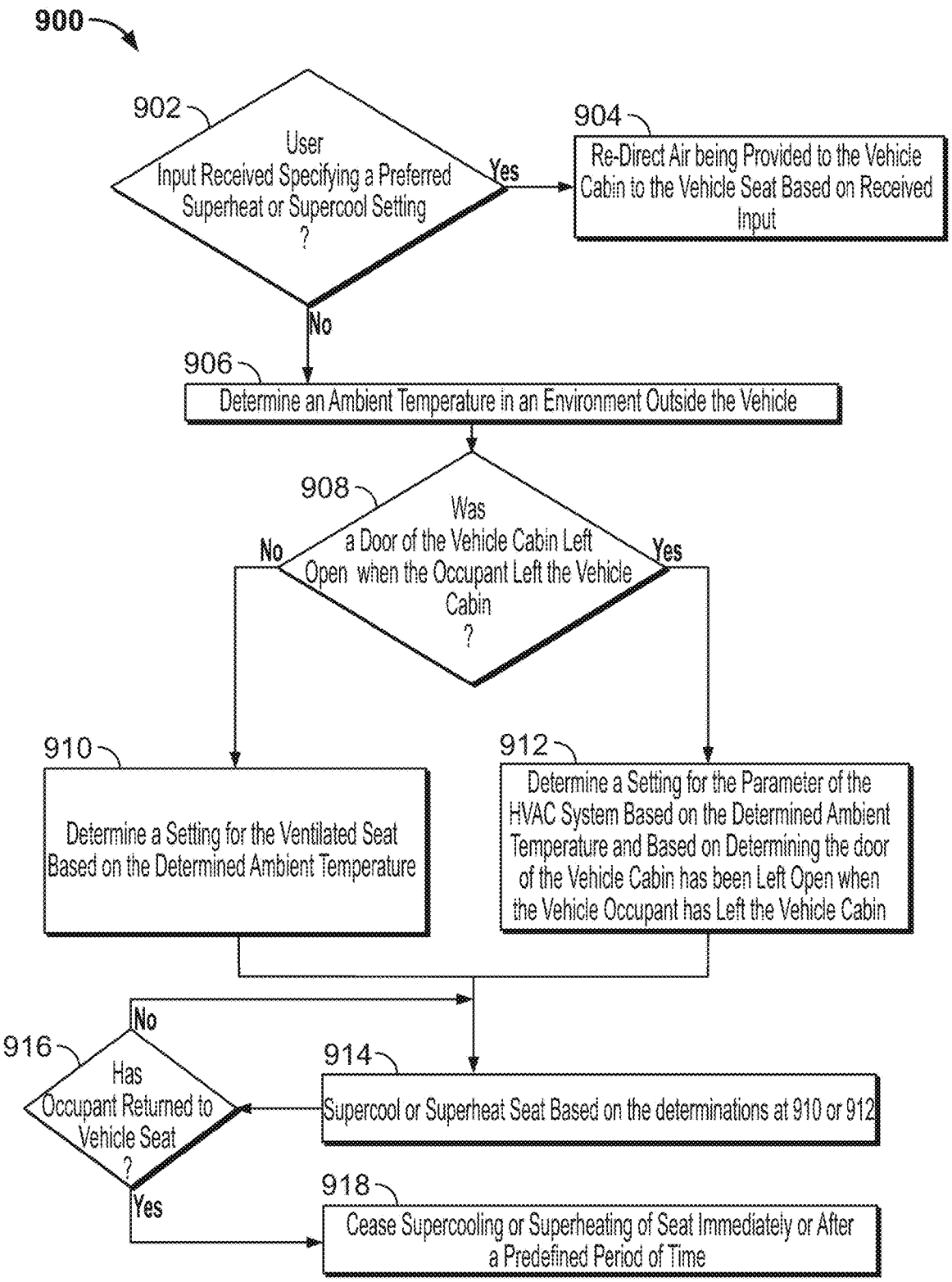
FIG. 9 shows a flowchart of an illustrative process for causing an HVAC system of a vehicle to thermally store energy in a vehicle seat, in accordance with some embodiments of the present disclosure.

FIG. 9 shows a flowchart 900 of an illustrative process for causing an HVAC system of a vehicle to thermally store energy in a vehicle seat, in accordance with some embodiments of the present disclosure. Process 900 may be executed at least in part by processing circuitry 102 of vehicle 101, and/or circuitry of HVAC system 116, or any other suitable circuitry, or any combination thereof.

At 902, processing circuitry 102 may determine whether user input has been received (e.g., via I/O circuitry 108 or via user device 154, or any other suitable deice, or any combination thereof) specifying a preferred heating or cooling setting for a superheating or supercooling seat 124 (or input interface 114, such as a steering wheel, or any other suitable component capable of storing thermal energy, or any combination thereof) to be used when vehicle occupant 312 leaves seat 124 or cabin 302. For example, occupant 312 may specify (interface 400 of FIG. 4, interface 300 of FIG. 3, or any suitable interface, or any combination thereof) that ventilated seat 124 should be heated or cooled at a certain setting (e.g., over and above the setting being employed when occupant 312 was still in seat 124 or any other suitable setting) when occupant 312 leaves vehicle cabin 302.

At 904, if such user input was received at 902, HVAC system 116 may be adjusted in accordance with the user input, when occupant 312 is determined to have left seat 124. In some embodiments, processing may proceed to 906 regardless of whether such user input is received.

At 906, processing circuitry 102 may determine an ambient temperature (and/or other ambient condition) in an environment outside vehicle 101. For example, the ambient temperature may be determined based on a signal or indication of the temperature received from ambient temperature sensor 137, or received from any suitable source (e.g., user device 154 or server 156 or any combination thereof).

At 908, processing circuitry 102 may determine whether a door of vehicle cabin 302 was left open when occupant 312 left vehicle seat 124. The determination of whether a door (or any other suitable door, window or other component, or any combination thereof) has been left open may be based on a signal or indication received from door sensor 140, or any other suitable sensor, or any combination thereof. If an affirmative determination is made at 908, processing may proceed to 912; otherwise processing may proceed to 910.

At 910, processing circuitry 102 may determine a thermal setting for seat 124 based on the determined ambient temperature. For example, processing circuitry 102 may compare the measured ambient temperature to certain ambient temperature thresholds or ambient temperature ranges, and determine whether to de-rate, maintain, or re-rate one or more HVAC components (e.g., air vent 120, supercooling or superheating of ventilated seat 124, and/or any other suitable component). In some embodiments, processing circuitry 102 may reference a lookup table (e.g., Table 1 discussed above) to determine a particular action to take, using any suitable number of parameters. In some embodiments, such actions may depend at least in part on the current HVAC settings and/or current measured temperature in vehicle cabin 302 or cargo space 306.

At 912, processing circuitry 102 may determine thermal setting for seat 124 for a parameter of HVAC system 116 based on the determined ambient temperature and/or the determination that a vehicle door has been left open. For example, processing circuitry 102 may determine that utilizing air blowers or air vent 120 while a vehicle door is open (e.g., during a delivery being performed by occupant 312) would provide little benefit to occupant 312 upon his return, since such air would merely be blown into the outside environment through the open door. Instead, processing circuitry 102 may determine to direct thermal energy to be stored in ventilated seat 124, which may be less susceptible to losing energy to the outside environment. In some embodiments, processing circuitry 102 may reference a lookup table to determine a particular action to take, using any suitable number of parameters.

At 914, processing circuitry 102 may supercool or superheat seat 124 based on the determinations at 910 or 912. In some embodiments, user input received at 902 may be taken into consideration in certain circumstances (e.g., if the setting associated with the user input would receive less energy than the recommended setting determined at 910 or 912, or in any other suitable circumstance). At 916, after such parameter has been adjusted or is in the process of being adjusted, processing circuitry 102 may determine whether occupant 312 has returned to seat 124 (e.g., based on one or more sensor signals, as discussed in connection with FIG. 1). If so, processing may proceed to 918, otherwise processing may return to 914.

At 918, processing circuitry 102 may cause HVAC system 116 to cease performing superconditioning of seat 124 immediately or after a predefined period of time. For example, if the adjustment corresponds to boosting an amount by which ventilated seat 124 should be heated or cooled, such operation may be ceased to avoid the seat becoming uncomfortably hot or uncomfortably cold. As another example, if the vehicle door was left open and the temperature of vehicle cabin 302 is very cold, it may provide thermal comfort to occupant 312 if a higher heating operation were to be performed for a predefined period of time (e.g., while occupant 312 drives to a next delivery location). In some embodiments, if processing circuitry 102 determines that the door was left open and subsequently closed by the driver, and the driver remains outside, then the process may proceed to 910 to determine a new setting.

In some embodiments, if processing circuitry 102 determines that occupant 312 has sat back down in seat 124 after returning from the outside environment, HVAC system 116 may be automatically switched to an in-cabin mode, in which air vents 120 (e.g., directed towards a face or feet of occupant 312, or any other suitable portion of occupant 312 or cabin 302, or any combination thereof) provide air conditioning or heat to condition the occupant.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A vehicle, comprising:
   a heating, ventilation, and air conditioning (HVAC) system configured to provide conditioned air via an air vent; and
   processing circuitry configured to:
      determine a vehicle occupant has left a seat of the vehicle; and
      in response to determining the vehicle occupant has left the seat, cause the HVAC system to thermally store energy in the seat by causing at least a portion of the conditioned air to be redirected to the seat.

2. The vehicle of claim 1, wherein the processing circuitry is further configured to:
   determine an ambient temperature in an environment of the vehicle; and
   cause the HVAC system to thermally store energy in the seat based at least in part on the ambient temperature.

3. The vehicle of claim 1, wherein the processing circuitry is further configured to:
   determine an ambient temperature in an environment of the vehicle;
   determine a door of the vehicle is left open; and
   cause the HVAC system to thermally store energy in the seat based at least in part on the ambient temperature and the door of the vehicle left open.

4. The vehicle of claim 1 wherein the processing circuitry is further configured to:
   modify a temperature setpoint of the HVAC system; and
   cause the HVAC system to thermally store energy in the seat based at least on the modified temperature setpoint.

5. The vehicle of claim 1, wherein the processing circuitry is further configured to:
   determine an input specifying a preferred heating or cooling setting for the seat; and
   cause the HVAC system to thermally store energy in the seat based at least in part on the input.

6. The vehicle of claim 1, wherein the processing circuitry is further configured to:
   determine the vehicle occupant has returned to the seat after leaving the seat; and
   in response to determining the vehicle occupant has returned to the seat, cease the storage of thermal energy in the seat immediately or after a predefined period of time.

7. The vehicle of claim 1, wherein the air vent is located in a cabin of the vehicle, and wherein the processing circuitry is further configured to permit unconditioned air to circulate in the cabin of the vehicle while causing the HVAC system to thermally store energy in the seat.

8. A heating, ventilation, and air conditioning (HVAC) system of a vehicle, the HVAC system comprising:
   input/output (I/O) circuitry configured to:
      receive a sensor signal that indicates whether a seat of the vehicle is unoccupied; and
   processing circuitry configured to:
      cause conditioned air to be provided via an air vent;
      determine, based on the sensor signal, the seat is unoccupied; and
      in response to determining that the seat is unoccupied, cause the HVAC system to thermally store energy in the seat by causing at least a portion of the conditioned air to be redirected to the seat.

9. The HVAC system of claim 8, wherein the processing circuitry is further configured to:
   determine an ambient temperature in an environment of the vehicle; and
   cause the HVAC system to thermally store energy in the seat based at least in part on the ambient temperature.

10. The HVAC system of claim 8, wherein the processing circuitry is further configured to:
    determine an ambient temperature in an environment of the vehicle;
    determine a door of the vehicle is left open; and
    cause the HVAC system to thermally store energy in the seat based at least in part on the ambient temperature and the door of the vehicle left open.

11. The HVAC system of claim 8, wherein the processing circuitry is further configured to:
    modify a temperature setpoint of the HVAC system; and
    cause the HVAC system to thermally store energy in the seat based at least on the modified temperature setpoint.

12. The HVAC system of claim 8, wherein the processing circuitry is further configured to:
    determine an input specifying a preferred heating or cooling setting for the seat; and
    cause the HVAC system to thermally store energy in the seat based at least in part on the input.

13. The HVAC system of claim 8, wherein the processing circuitry is further configured to:
    determine whether a vehicle occupant has returned to the seat after leaving the seat; and
    in response to determining the vehicle occupant has returned to the seat, cease the storage of thermal energy in the seat immediately or after a predefined period of time.

14. The HVAC system of claim 8, wherein the air vent is located in a cabin of the vehicle, and wherein the processing circuitry is further configured to permit unconditioned air to circulate in the cabin of the vehicle while causing the HVAC system to thermally store energy in the seat.

15. A method, comprising:

determining, by processing circuitry, whether a seat of a vehicle is unoccupied, wherein the vehicle comprises a heating, ventilation, and air conditioning (HVAC) system configured to provide conditioned air via an air vent; and in response to determining that the seat is unoccupied, causing the HVAC system to thermally store energy in the seat by causing at least a portion of the conditioned air to be redirected to the seat.

16. The method of claim 15, further comprising:

determining an ambient temperature in an environment of the vehicle;

determining an ambient temperature in an environment of the vehicle; and causing the HVAC system to thermally store energy in the seat based at least in part on the ambient temperature.

17. The method of claim 15, further comprising:

determining an ambient temperature in an environment of the vehicle; and determining a door of the vehicle is left open; and causing the HVAC system to thermally store energy in the seat based at least in part on the ambient temperature and the door of the vehicle left open.

18. The method of claim 15, further comprising:

determining an input specifying a preferred heating or cooling setting for the seat; and causing the HVAC system to thermally store energy in the seat based at least in part on the input.

19. The method of claim 15, further comprising:

determining whether a vehicle occupant has returned to the seat after leaving the seat; and in response to determining the vehicle occupant has returned to the seat, cease the storage of thermal energy in the seat immediately or after a predefined period of time.

20. The method of claim 15, wherein the air vent is located in a cabin of the vehicle, and wherein the method further comprises permitting unconditioned air to circulate in the cabin of the vehicle while causing the HVAC system to thermally store energy in the seat.

\* \* \* \* \*